(12) United States Patent
Stewart et al.

(10) Patent No.: US 7,262,686 B2
(45) Date of Patent: Aug. 28, 2007

(54) METHODS AND APPARATUSES TO IDENTIFY DEVICES

(75) Inventors: Roger G. Stewart, Morgan Hill, CA (US); John Stephen Smith, Berkeley, CA (US)

(73) Assignee: Alien Technology, Morgan Hill, CA (US)

( * ) Notice: Subject to any disclaimer, the term of this patent is extended or adjusted under 35 U.S.C. 154(b) by 0 days.

(21) Appl. No.: 11/132,085

(22) Filed: May 17, 2005

(65) Prior Publication Data

US 2005/0211787 A1 Sep. 29, 2005

Related U.S. Application Data

(63) Continuation of application No. 10/160,458, filed on May 30, 2002, now Pat. No. 6,988,667.

(60) Provisional application No. 60/295,502, filed on May 31, 2001, provisional application No. 60/329,391, filed on Oct. 12, 2001.

(51) Int. Cl.
*H04Q 5/22* (2006.01)
*G09F 9/30* (2006.01)
*G08B 3/00* (2006.01)

(52) U.S. Cl. .............. 340/10.41; 340/10.32; 235/462; 235/385

(58) Field of Classification Search ........... 340/10.41, 340/10.32; 235/492, 462.13, 385
See application file for complete search history.

(56) References Cited

U.S. PATENT DOCUMENTS

| 4,071,908 A * | 1/1978 | Brophy et al. ............. 710/46 |
| 4,107,675 A | 8/1978 | Sellers et al. |
| RE31,375 E | 9/1983 | Sellers et al. |
| 4,510,495 A | 4/1985 | Sigrimis et al. |
| 4,667,193 A * | 5/1987 | Cotie et al. ............. 340/825.52 |
| 4,822,990 A | 4/1989 | Tamada et al. |
| 5,053,774 A | 10/1991 | Schuermann et al. |
| 5,063,386 A | 11/1991 | Bourdeau et al. |

(Continued)

FOREIGN PATENT DOCUMENTS

| CA | 2266337 A1 | 9/2000 |
| EP | 0 702 324 A2 | 3/1996 |

OTHER PUBLICATIONS

PCT International Preliminary Examination Report for PCT Appln No. US02/17159, mailed Nov. 4, 2005 (5 pages).

(Continued)

*Primary Examiner*—Jeffery Hofsass
*Assistant Examiner*—Scott Au
(74) *Attorney, Agent, or Firm*—Blakely, Sokoloff, Taylor & Zafman LLP

(57) ABSTRACT

A reader identifies tags without requiring or determining whether a response to an interrogation was a single response from a single tag or multiple responses from multiple tags. A method is performed by a tag in an identification system, and the method includes receiving a first data from a reader, and correlating the first data with a first corresponding portion of the tag's identification code, and specifying a match if the first data matches the first corresponding portion, and receiving second data which, combined with the first data, is correlated with a second corresponding portion of the tag's identification code.

27 Claims, 14 Drawing Sheets

U.S. PATENT DOCUMENTS

| | | |
|---|---|---|
| 5,144,314 A | 9/1992 | Malmberg et al. |
| 5,245,534 A | 9/1993 | Waterhouse et al. |
| 5,266,925 A | 11/1993 | Vercellotti et al. |
| 5,305,008 A | 4/1994 | Turner et al. |
| 5,339,073 A | 8/1994 | Dodd et al. |
| 5,365,551 A | 11/1994 | Snodgrass et al. |
| 5,387,915 A | 2/1995 | Moussa et al. |
| 5,387,993 A | 2/1995 | Heller et al. |
| 5,398,326 A | 3/1995 | Lee |
| 5,438,335 A | 8/1995 | Schuermann et al. |
| 5,444,448 A | 8/1995 | Schuermann et al. |
| 5,491,482 A | 2/1996 | Dingwall et al. |
| 5,500,650 A | 3/1996 | Snodgrass et al. |
| 5,502,445 A | 3/1996 | Dingwall et al. |
| 5,548,291 A | 8/1996 | Meier et al. |
| 5,550,547 A | 8/1996 | Chan et al. |
| 5,583,850 A | 12/1996 | Snodgrass et al. |
| 5,604,486 A | 2/1997 | Lauro et al. |
| 5,627,544 A | 5/1997 | Snodgrass et al. |
| 5,640,002 A | 6/1997 | Ruppert et al. |
| 5,641,365 A | 6/1997 | Peterson et al. |
| 5,698,837 A | 12/1997 | Furuta |
| 5,742,238 A | 4/1998 | Fox |
| 5,774,062 A | 6/1998 | Ikefuji |
| 5,774,876 A | 6/1998 | Woolley et al. |
| 5,777,561 A | 7/1998 | Chieu et al. |
| 5,804,810 A | 9/1998 | Woolley et al. |
| 5,841,365 A | 11/1998 | Rimkus |
| 5,850,187 A | 12/1998 | Carrender et al. |
| 5,856,788 A | 1/1999 | Walter et al. |
| 5,874,724 A | 2/1999 | Cato |
| 5,883,582 A | 3/1999 | Bowers et al. |
| 5,892,441 A | 4/1999 | Woolley et al. |
| 5,929,779 A | 7/1999 | MacLellan et al. |
| 5,940,006 A * | 8/1999 | MacLellan et al. ........ 340/10.1 |
| 5,963,134 A | 10/1999 | Bowers et al. |
| 5,974,078 A | 10/1999 | Tuttle et al. |
| 5,995,019 A | 11/1999 | Chieu et al. |
| 6,021,433 A | 2/2000 | Payne et al. |
| 6,027,027 A * | 2/2000 | Smithgall .................. 235/488 |
| 6,034,603 A | 3/2000 | Steeves |
| 6,036,101 A | 3/2000 | Hass et al. |
| 6,072,801 A | 6/2000 | Wood, Jr. et al. |
| 6,078,258 A | 6/2000 | Auerbach et al. |
| 6,084,512 A | 7/2000 | Elberty et al. |
| 6,089,453 A | 7/2000 | Kayser et al. |
| 6,102,286 A | 8/2000 | Hammond |
| 6,177,858 B1 | 1/2001 | Raimbault et al. |
| 6,204,765 B1 * | 3/2001 | Brady et al. ............. 340/572.1 |
| 6,456,191 B1 * | 9/2002 | Federman .................. 340/10.2 |
| 6,550,674 B1 * | 4/2003 | Neumark .................... 235/383 |
| 6,677,852 B1 * | 1/2004 | Landt ........................ 340/10.1 |
| 2002/0149481 A1 * | 10/2002 | Shanks et al. ........... 340/572.1 |

OTHER PUBLICATIONS

PCT Invitation to Pay Additional Fees for PCT International Appln No. US02/17159, mailed Oct. 16, 2002 (9 pages).

* cited by examiner

| Code | |
|---|---|
| Tag #1 | 000100 |
| Tag #2 | 000101 |
| Tag #3 | 000110 |
| Tag #4 | 100011 |

Note:
M = Match
N = No Match

| Search Time Label (201) | Search Command From Reader (203) | Reader's Memory Of Each Tag's Input Correlator Register (205) | Tag #1 Response (207) | Tag #2 Response (209) | Tag #3 Response (211) | Tag #4 Response (213) |
|---|---|---|---|---|---|---|
| ① | Down | 0 - - - - - | M | M | M | N |
| ② | Down | 0 0 - - - - | M | M | M | N |
| ③ | Down | 0 0 0 - - - | M | M | M | N |
| ④ | Down | 0 0 0 0 - - | N | N | N | N |
| ⑤ | Toggle | 0 0 0 1 - - | M | M | M | N |
| ⑥ | Down | 0 0 0 1 0 - | M | M | N | N |
| ⑦ | Down | 0 0 0 1 0 0 | M | N | N | N |
| ⑧ | Confirm (Optional) | 0 0 0 1 0 0 | M | N | N | N |
| ⑨ | Toggle | 0 0 0 1 0 1 | N | M | N | N |
| ⑩ | Up | 0 0 0 1 0 - | M * | M * | N | N |
| ⑪ | Toggle | 0 0 0 1 1 - | N | N | M | N |
| ⑫ | Down | 0 0 0 1 1 0 | N | N | M | N |
| ⑬ | Toggle | 0 0 0 1 1 1 | N | N | N | N |
| ⑭ | Up | 0 0 0 1 1 - | N | N | M * | N |
| ⑮ | Up | 0 0 0 1 - - | M * | M * | M * | N |
| ⑯ | Up | 0 0 0 - - - | M * | M * | M * | N |
| ⑰ | Toggle | 0 0 1 - - - | N | N | N | N |
| ⑱ | Up | 0 0 - - - - | M * | M * | M * | N |
| ⑲ | Toggle | 0 1 - - - - | N | N | N | N |
| ⑳ | Up | 0 - - - - - | M * | M * | M * | N |

FIG. 5A

| Search Time Label | Search Command From Reader | Reader's Memory Of Each Tag's Input Correlator Register | Tag #1 | Tag #2 | Tag #3 | Tag #4 |
|---|---|---|---|---|---|---|
| ㉑ | Toggle | 1 - - - - - | N | N | N | M |
| ㉒ | Down | 1 0 - - - - | N | N | N | M |
| ㉓ | Down | 1 0 0 - - - | N | N | N | M |
| ㉔ | Down | 1 0 0 0 - - | N | N | N | M |
| ㉕ | Down | 1 0 0 0 0 - | N | N | N | N |
| ㉖ | Toggle | 1 0 0 0 1 - | N | N | N | M |
| ㉗ | Down | 1 0 0 0 1 0 | N | N | N | N |
| ㉘ | Toggle | 1 0 0 0 1 1 | N | N | N | M |
| ㉙ | Up | 1 0 0 0 1 - | N | N | N | M* |
| ㉚ | Up | 1 0 0 0 - - | N | N | N | M* |
| ㉛ | Toggle | 1 0 0 1 - - | N | N | N | N |
| ㉜ | Up | 1 0 0 - - - | N | N | N | M* |
| ㉝ | Toggle | 1 0 1 - - - | N | N | N | N |
| ㉞ | Up | 1 0 - - - - | N | N | N | M* |
| ㉟ | Toggle | 1 1 - - - - | N | N | N | N |

(Binary Tree Completed)

Note: M* = Response from tag (if any) is effectively ignored by reader as reader knows the responding tag is in a binary space (e.g., portion of binary tree) which has already been searched.

FIG. 5B

METHODS AND APPARATUSES TO IDENTIFY DEVICES

This application is a continuation application of U.S. patent application Ser. No. 10/160,458, filed May 30, 2002 now U.S. Pat. No. 6,988,667, and also claims the benefit of two prior U.S. Provisional Patent Applications: (1) Application Ser. No. 60/295,502, filed May 31, 2001, and (2) Application Ser. No. 60/329,391, filed Oct. 12, 2001.

BACKGROUND OF THE INVENTION

The present invention relates to the field of devices having an identifier, such as tags, and further relates to methods and apparatuses for identifying such tags.

It is desirable to interrogate multiple wireless tags by sending from an interrogating transmitter a code and having information transmitted by the tag in response. This is commonly accomplished by having the tag listen for an interrogation message and for it to respond with a unique serial number and/or other information. However, it is desirable to extend the range of wireless tags so that it is not necessary to bring each tag close to a reader for reading. Two problems often occur when extending the range of the reading system. One of the problems is that there is limited power available for transmission from the wireless tag, and if the range is significant, it is possible that many tags will be within the range of the interrogating system and their replies may corrupt each other. Current implementations of radio frequency (RF) tags require considerable logic to handle interface protocol and anti-collision problems which occur when multiple tags within the range of a reader attempt to all reply to an interrogating message. For example, current integrated circuits which are used in RF tags require nearly 3,000 logic gates to handle an interface protocol and to handle anti-collision protocols. This considerable size required by an integrated circuit increases the cost of the RF tag and thus makes is less likely for such a tag to be more commonly used. Prior art attempts to avoid collisions when reading multiple RF tags are described in U.S. Pat. Nos. 5,266,925 and 5,883,582. However, these prior art approaches provide inefficient solutions for avoiding collision when reading multiple RF tags.

SUMMARY OF THE INVENTION

Methods and apparatuses for identifying devices, such as RF tags, are described.

In one exemplary method of an embodiment of the invention, a reader identifies tags without requiring or determining whether a response to an interrogation was a single response from a single tag or multiple responses from multiple tags.

In another exemplary method of an embodiment, a method is performed by a tag in an identification system, and the method includes receiving a first data from a reader, and correlating the first data with a first corresponding portion of the tag's identification code, and specifying a match if the first data matches the first corresponding portion, and receiving second data which, combined with the first data, is correlated with a second corresponding portion of the tag's identification code.

In another exemplary method of an embodiment, a method is performed by a reader in an identification system, where the method includes transmitting first data from the reader which corresponds to a first portion of a tag identification code and transmitting second data from the reader which, with the first data, corresponds to a second portion of the tag's identification code.

In another exemplary method of an embodiment, a reader searches a first level of a binary space with a first length code and then searches a second level of the binary space with a second length code where the second length code is longer than the first length code.

Other methods and apparatuses are also described below. For example, the present invention includes apparatuses which perform these methods, including data processing systems which perform these methods and computer readable media, which when executed on data processing systems, cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 5A and 5B show a chart indicating a particular search protocol according to one embodiment of the present invention.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Figure 1:
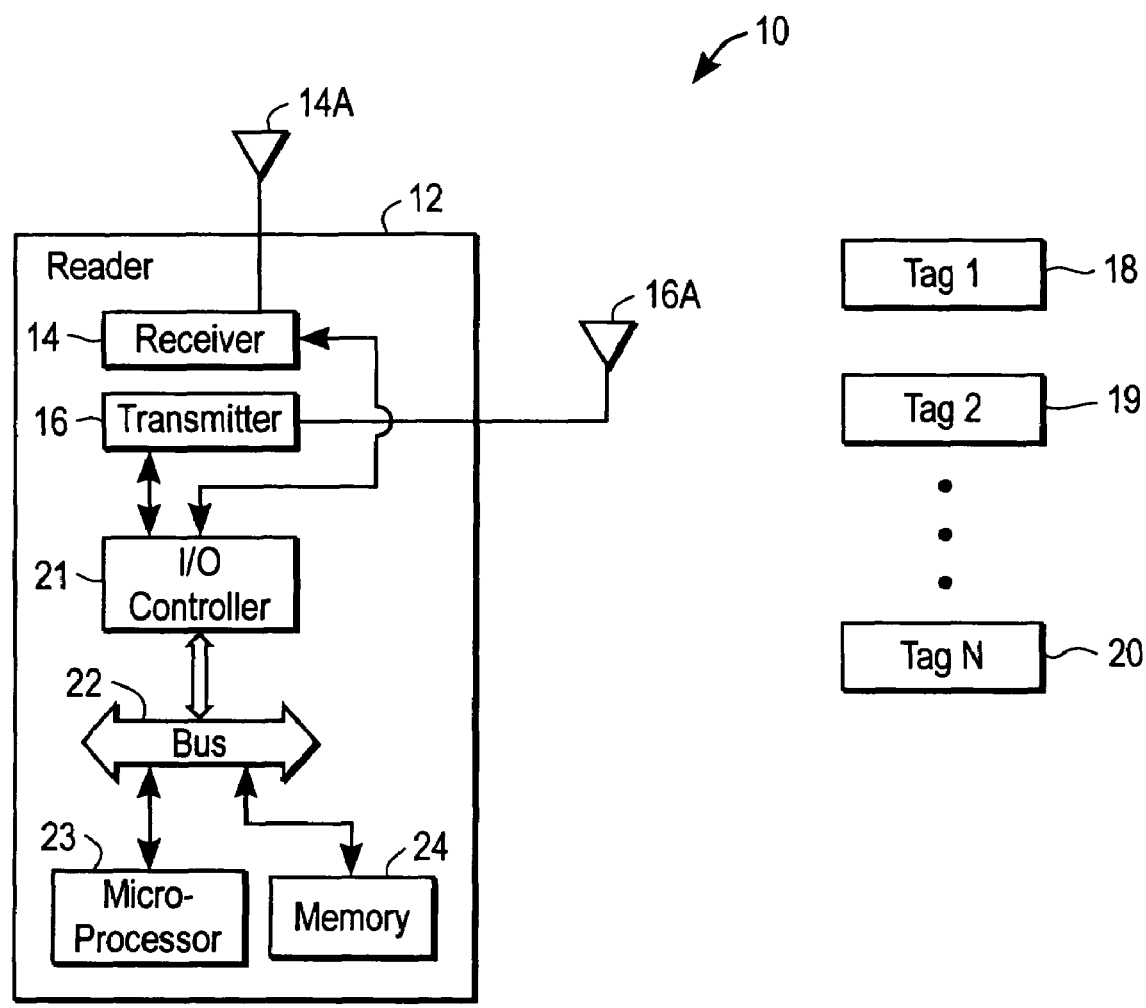
FIG. 1 shows an example of an identification system which includes a reader and a plurality of RF tags.

FIG. 1 illustrates an example of an identification system 10 which includes a reader 12 and a plurality of tags 18, 19, and 20. The system is typically a reader-talks-first RF ID system using either passive or semi-passive active backscatter transponders as tags. The incorporation of a battery and/or memory into a tag is an expanded feature to facilitate longer read range; however, the use of the battery does require certain trade-offs, such as higher costs, limited longevity, larger form factor, greater weight, and end-of-life disposal requirements. Thus the tags 18, 19, and 20 may have memory and/or a battery or may have neither of these elements. It will be appreciated that different types of tags may be mixed in a system where a reader is interrogating tags with batteries and tags without batteries. There are at least 4 classes of tags which may be used with the present invention: (1) no power source on the tag except for power which is obtained from the tag's antenna, but the tag does include a read-only memory which has the tag's identification code; (2) a tag without internal power, but when powered from the reader, can write data to non-volatile memory in the tag; this type of tag also includes memory for storing the identification code; (3) a tag with a small battery to provide power to the circuitry in the tag. Such a tag may also include non-volatile memory as well as memory for storing the tag's identification code; (4) a tag which can communicate with each other or other devices.

FIG. 1 shows an embodiment of a reader. The reader 12 will typically include a receiver 14 and a transmitter 16, each of which are coupled to an I/O (input/output) controller 21. The receiver 14 may have its own antenna 14*a*, and the transmitter 16 may have its own antenna 16*a*. It will be appreciated by those in the art that the transmitter 16 and the receiver 14 may share the same antenna provided that there is a receive/transmit switch which controls the signal present on the antenna and which isolates the receiver and transmitter from each other. The receiver 14 and the transmitter 16 may be similar to conventional receiver and transmitter units found in current readers. The receiver and transmitter typically operate, in North America, in a frequency range of about 900 megahertz. Each is coupled to the I/O controller 21 which controls the receipt of data from the receiver and the transmission of data, such as commands, from the transmitter 16. The I/O controller is coupled to a bus 22 which is in turn coupled to a microprocessor 23 and a memory 24. There are various different possible implementations which may be used in the reader 12 for the processing system represented by elements 21, 22, 23, and 24. In one implementation, the microprocessor 23 is a programmable microcontroller, such as an 8051 microcontroller or other well-known microcontrollers or microprocessors (e.g. a power PC microprocessor) and the memory 24 includes dynamic random access memory and a memory controller which controls the operation of the memory; memory 24 may also include a non-volatile read only memory for storing data and software programs. The memory 24 typically contains a program which controls the operation of the microprocessor 23 and also contains data used during the processing of tags as in the interrogation of tags. In one embodiment further described below, the memory 24 would typically include a computer program which causes the microprocessor 23 to send search commands through the I/O controller 21 to the transmitter and to receive responses from the tags through the receiver 14 and through the I/O controller 21. The memory 24 would further include a data structure such as a binary tree, e.g. the binary tree shown in FIGS. 5C and 5D, which tree is created as a result of the particular search algorithm which is further described below. The reader 12 may also include a network interface, such as an Ethernet interface, which allows the reader to communicate to other processing systems through a network. The network interface would typically be coupled to the bus 22 so that it can receive data, such as the list of tags identified in an interrogation from either the microprocessor 23 or from the memory 24.

Figure 2A:
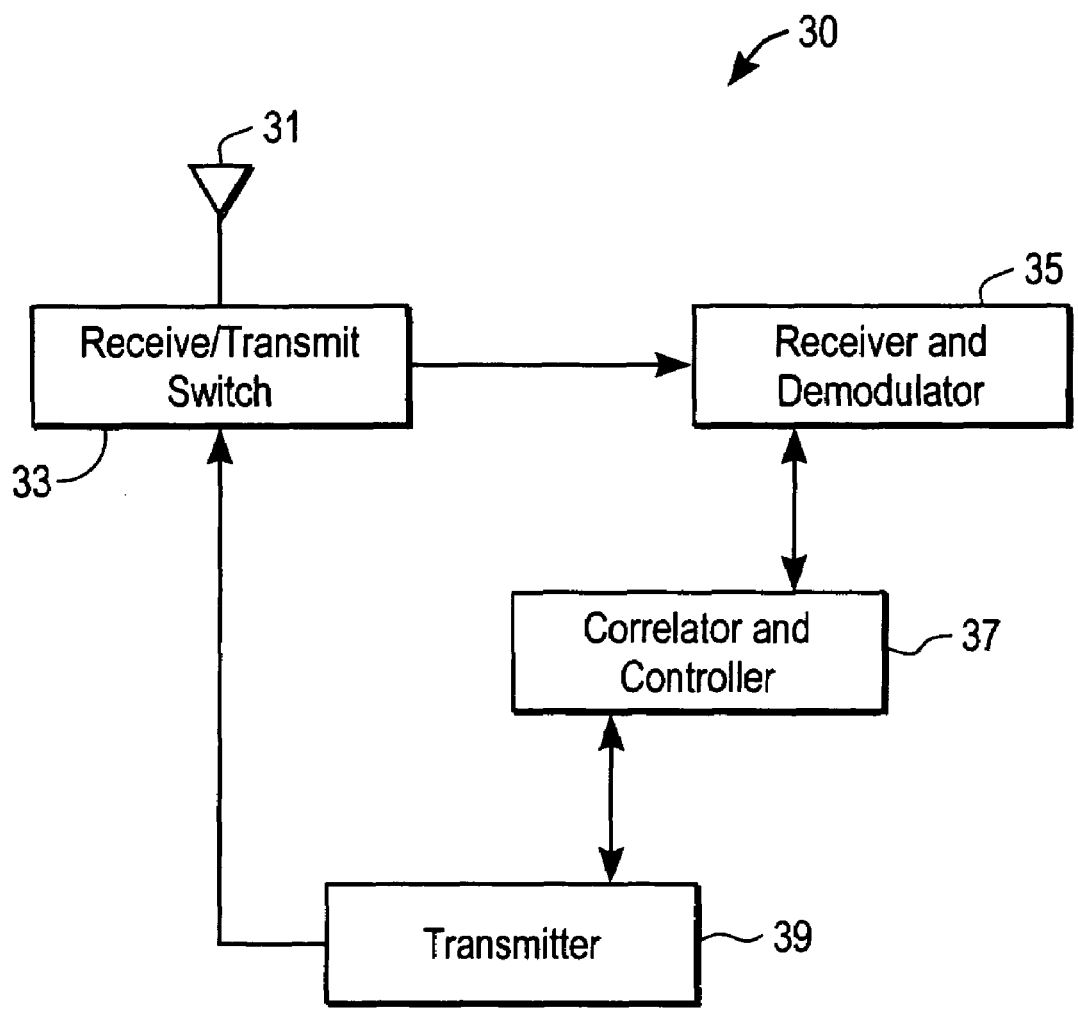
FIG. 2A shows an example of one embodiment of an RF tag which may be used with the present invention.
Figure 4:
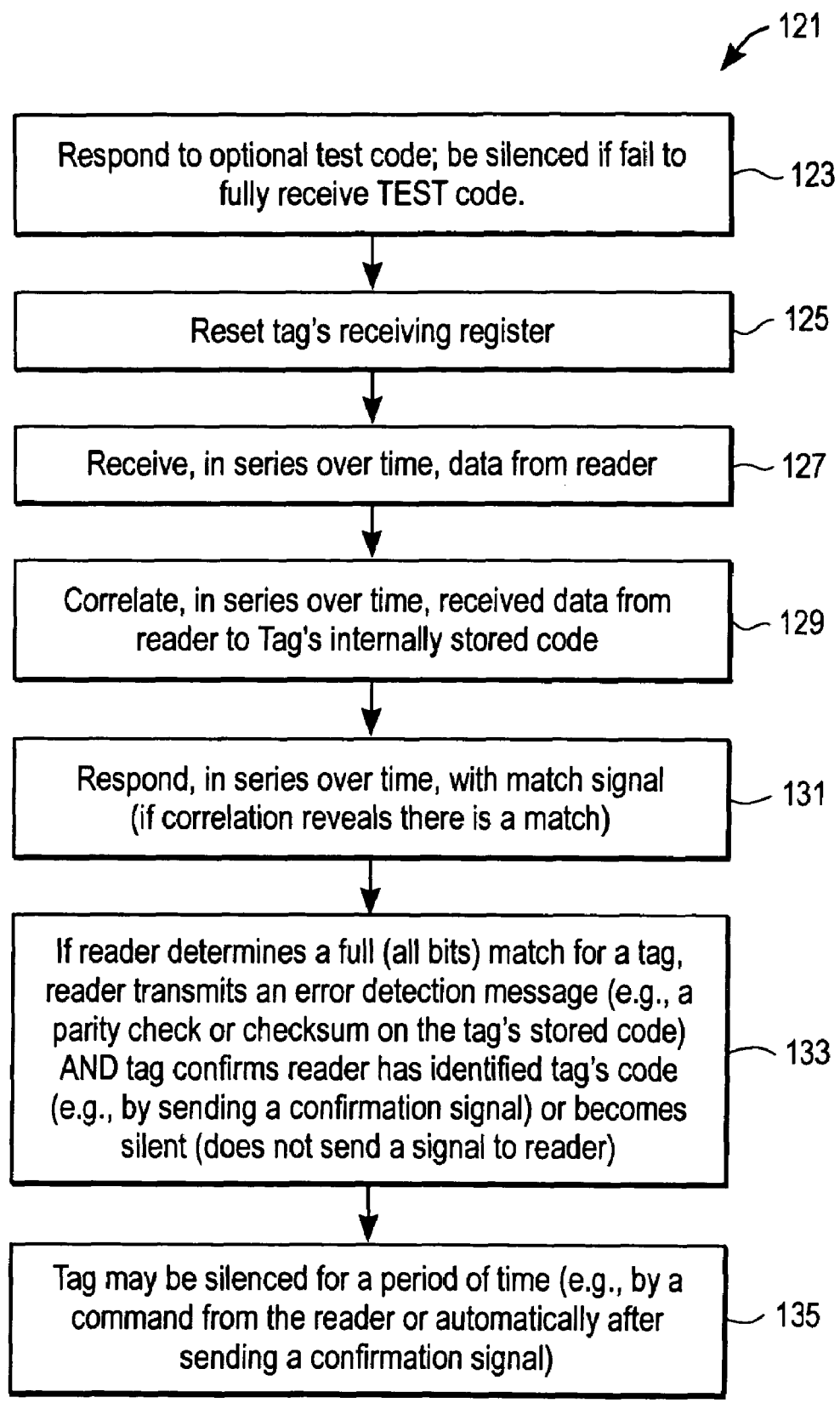
FIG. 4 is a flowchart showing an exemplary method of a tag according to one embodiment of the present invention.

FIG. 2A shows an example of one implementation of a tag which may be used with the present invention. The tag 30 includes an antenna 31 which is coupled to a receive/transmit switch 33. This switch is coupled to the receiver and demodulator 35 and to the transmitter 39. A correlator and controller unit 37 is coupled to the receiver and demodulator 35 and to the transmitter 39. The particular example shown in FIG. 2A of a tag may be used in various embodiments in which a memory for maintaining data between commands is maintained in the tag and in which a bit by bit correlation occurs in the tag. An example of such an implementation is shown in FIG. 4 and a further example is shown in FIGS. 5A through 5D. The receiver and demodulator 35 receives signals through the antenna 31 and the switch 33 and demodulates the signals and provides these signals to the correlator and controller unit 37. Commands received by the receiver 35 are passed to the controller of the unit 37 in order to control the operation of the tag. Data received by the receiver 35 is also passed to the control unit 37, and this data may be correlated with the tag's identification code in the embodiments described below. The transmitter 39, under control of the control unit 37, transmits responses or other data through the switch 33 and the antenna 31 to the reader. It will be appreciated by those in the art that the transmitter may be merely a switch or other device which modulates reflections from an antenna, such as antenna 31.

Figure 2B:
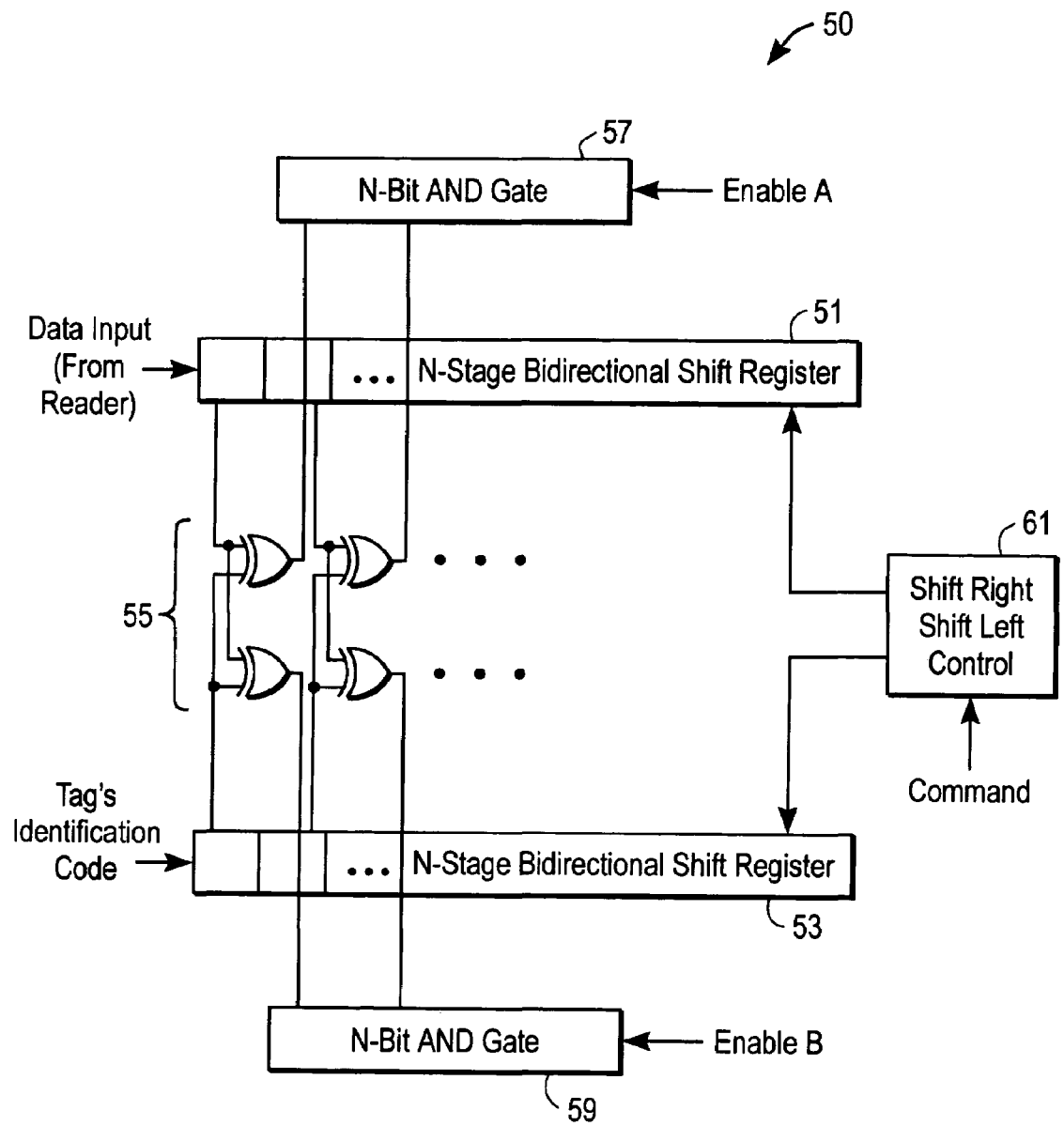
FIG. 2B shows a particular circuit, which is a correlation circuit, which may be used in certain embodiments of RF tags according to the present invention.

FIG. 2B shows a specific implementation of a correlation system which may be used in a tag, such as the tag shown in FIG. 2A. Correlation system 50 includes two N-stage bi-directional shift registers 51 and 53 which are controlled by the control unit 61 which receives commands from the reader through a receiver and demodulator of the tag. The correlation system 50 also includes a set of exclusive OR gates 55 and an N-bit AND gate 57 and an N-bit AND gate 59. A DOWN command, as is described further below, causes each register to shift its least significant bit pointer on the register one bit position to the right, shifting down to a lower significant bit from the current least significant bit, and to input a logic 0 as the new least significant bit. A TOGGLE command, as is further described below, toggles the current least significant bit (pointed to by the bit pointer) from a 0 to a 1, and an UP command shifts the least significant bit pointer on each register to the left one bit position (to the next higher significant bit) and drops the last prior least significant bit. The exclusive OR gates compare the current binary code received from the reader in register 51 with the tag's internal identification code which is stored in the register 53. The exclusive OR gates enable the tag to respond in one embodiment to the reader only if all loaded bits match the corresponding portion of the tag's identification code stored in the register 53. The exclusive OR circuits are disabled for any unloaded stages of the shift register so that when empty, the tag always responds to any query. In one embodiment of the invention, a tag may be fabricated through a fluidic self-assembly process. For example, an integrated circuit may be fabricated with a plurality of other integrated circuits in a semiconductor wafer. The integrated circuit will include, if possible, all the necessary logic of a particular RF tag, excluding the antenna 31. Thus, all the logic shown in the tag 30 would be included on a single integrated circuit and fabricated with similar integrated circuits on a single semiconductor wafer. Each circuit would be programmed with a unique identification code and then the wafer would be processed to remove each integrated circuit from the wafer to create blocks which are suspended in a fluid. The fluid is then dispersed over a substrate, such as a flexible substrate, to create separate RF tags. Receptor regions in the substrate would receive at least one integrated circuit, which then can be connected with an antenna on the substrate to form an RF tag. An example of fluidic self assembly is described in U.S. Pat. No. 5,545,291.

Figure 3:
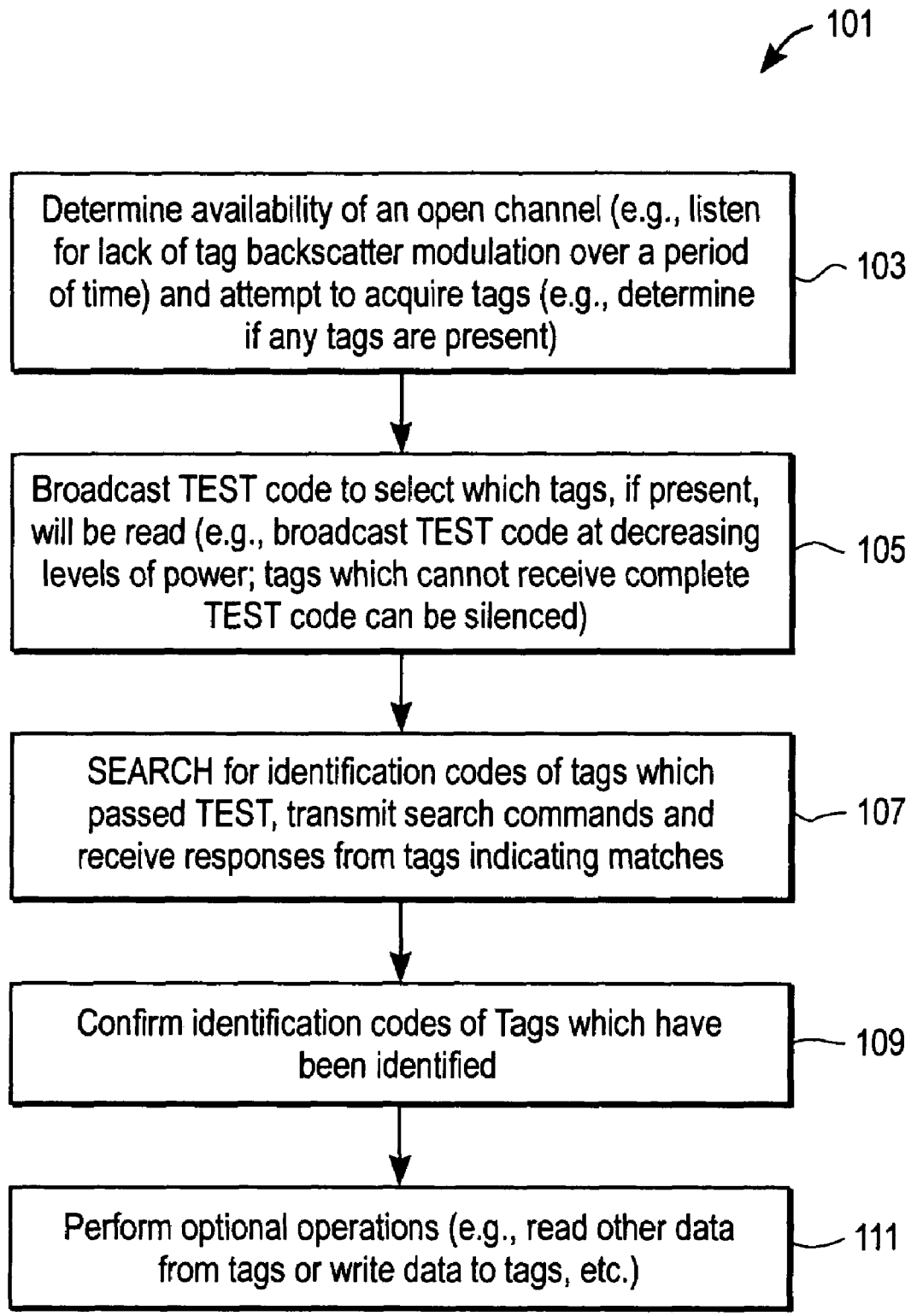
FIG. 3 is a flowchart representing an exemplary method of a reader according to the present invention.

FIG. 3 shows one example of a method according to the invention for operating a reader. Method 101 may begin in operation 103 in which the reader determines the availability of an open channel. In one embodiment, the reader would listen for the lack of tag backscatter modulation over a period of time, and if there is no such backscatter modulation, then the channel is available. At this point, the reader would attempt to acquire any tags. For example, it may broadcast a signal to determine whether any tags are present. If no tags are present, the reader may become quiescent and resume operation 103 at some point in time later. On the other hand, if tags are present, then in operation 105 the reader may perform an optional test to select which tags, if present, will be read. The reader, for example, may broadcast a test code at decreasing levels of power, and tags which cannot receive a complete test code can be silenced as a result of this test. Tags which are not silenced as a result of the optional test code can then be searched in operation 107. Typically the tag is searched by receiving commands, which are search commands, from the reader and responding to these search commands by indicating a match when a match does occur. Normally, only a match at a tag causes the tag to respond to a search command in typical embodiments of the present invention. After finding a particular identification code in a tag, the reader may optionally confirm the identification code. This confirmation may involve performing a checksum on the identification code at the reader and then transmitting the checksum to the tag and having the tag perform a similar checksum operation and confirm it arrives at the same checksum. Failure to arrive at the checksum at the tag produces an error signal which causes the tag to silence itself and not respond, causing the reader to remove the identification code of the tag from its list of identified tags. Other methods of confirming the code may alternatively be used. Operation 111 involves performing optional operations such as reading other data from the tags or writing data to the tags, etc.

OVERVIEW OF EMBODIMENTS OF COMMUNICATION PROTOCOLS

I. A Method of Addressing, Identifying and Communicating with Devices of Unknown Numbers and Addresses Without a Physical Channel Collision Detection Mechanism This method is applicable to situations where it is desirable to communicate with an unknown, possibly large, number of elements. The same communications channel is used for responses, and potentially multiple devices may respond simultaneously. The method does not require distinguishing single responses from multiple responses on the channel.

A class of devices which are called readers normally initiate all communications. Multiple readers typically use methods that will be described separately to insure that their messages do not collide with each other. The target devices, called tags, each have an identifier that is guaranteed to be unique. Although the terminology of wireless tags (or Radio Frequency Tags or RF Tags) is used to describe the method, it should be recognized that the method can be applied to other communications methods and to other devices with which communication is desirable.

A. An individual reader issues a command or commands that identify a set of devices which are to respond if they are in the set.

B. Any and all devices which are in the set respond to the command, and the response or lack of response is noted by the reader.

C. The reader issues an additional command or commands which identify different sets of devices that are to respond if they are in that set.

D. Any and all devices that are in that set respond to the command, and the response or lack of response to that command is noted by the reader.

Steps C and D are repeated until the reader can uniquely identify a tag. Steps C and D are further repeated until the set of all tags has been divided into sets which include one unique tag, and sets for which no tag responds, and are therefore empty of responsive tags. Once the tags have been uniquely identified, communications can proceed without fear of channel collisions by using the unique identifiers to insure only one tag responds. These additional commands could include a checking of check sums or other error checking to verify the identification of the tags.

Advantages of this technique include that only single bit responses are needed from the tags, in the event that channel is noisier or slower than the channel from the reader to the tags, and that no channel collision mechanism is required, there is no requirement to be able to distinguish a single response from multiple responses from tags. Further advantages include the possibility of a very simple mechanism at the tag.

Note that if a tag responds sometimes, and does not respond at other times, then it may not be listed in the list of responsive tags, but it will not otherwise cause the process to fail. Responsive tags are defined as tags that respond to all germane commands. Implementations fall roughly into two types, those which tags do not require any persistent state information from one command to the next, called inter-command memoryless tag implementations, and those that do require information to persist between commands. One advantage of implementations that do require information to be retained between commands is the potentially large reduction in the information that is required to be sent with each command.

The identifier that is given to each tag may include additional information beyond that required to make it unique. For example, such additional information could include a checksum, to check for errors in the process, or a security code to make sure that an authorized party issued the tag's identifier.

In most cases, the identifier that is given to each tag can be mapped to a finite countable set, which can be mapped one for one to a finite range of integers. Thus, without loss of generality, most of the following specific implementations use a finite range of integers for the identifier, called a serial number (or tag's code or identification code). In some of the implementations, there is no specific upper limit on the range of the serial numbers, and so the corresponding range of identifiers is the countably infinite set of all integers. In some of the implementations, explicit mapping of the integers onto a string of binary symbols is used for clarity, but any one for one mapping of the unique identifiers onto strings of binary symbols is equivalent.

A 1. Inter-command Memoryless Tag Implementation Using an Integer Range Mechanism Each tag is associated with a guaranteed unique integer (serial number). Each command describes a subset of integers. A tag will respond if and only if its serial number is in the described set. The reader continues to issue commands describing different subsets of integers until it arrives at a range that only includes a unique integer, and the tag responds. Further commands are executed until the entire number space is divided into unique serial numbers and integer ranges in which no tag responds. Once unique tag serial numbers have been identified, further commands can specify a serial number to guarantee that only one tag at a time will respond, and responses will therefore not collide. Advantages of this method include the lack of a need for a memory at the tags that is persistent between commands, and a small number of commands and responses to identify each tag in a group of random tags from scratch, and the small number of commands and responses that are required to identify new members of a group of random tags.

A 2. Inter-command Memoryless Implementation Using Binary Serial Number String and a Mask Each tag is associated with a guaranteed unique integer mapped to a unique binary sequence of 1's and 0's called SERIAL_NUMBER. Each command from a reader specifies a PATTERN and a MASK, each of these also being a binary sequence of 1's and 0's. The tags respond if for all of the bits that are a 1 in the MASK, the PATTERN matches the SERIAL_NUMBER. The reader continues to issue commands describing different PATTERNS and MASKS, until it arrives at a MASK in which all bits are 1, and the unique tag with that SERIAL_NUMBER responds. The reader additionally continues to issue commands describing different PATTERNS and MASKS, until it has divided the set of all possible SERIAL_NUMBERS tags into two groups: (1) SERIAL_NUMBERs which correspond to unique tags, and (2) sets of SERIAL_NUMBERs in which no tag responds. Advantages of this method include the lack of a need for a memory at the tags that is persistent between commands and a potentially simple comparison mechanism at the tag.

A 3. Inter-command Memoryless Implementation Using Binary Serial Number String and a Bit Position Pointer Each tag is associated with a guaranteed unique integer expressed as a binary sequence of 1's and 0's called SERIAL_NUMBER, which has a specified length. Each command from a reader specifies a PATTERN, also being a binary sequence of 1's and 0's and an integer called a BIT_POINTER. The tags respond if for all of the bits numbered less than BIT_POINTER, the PATTERN matches the SERIAL_NUMBER. The reader continues to issue commands describing different PATTERNS and BIT_POINTERS until each time the BIT_POINTER points to the last available bit, a range that only includes a unique integer, and the tag with that SERIAL_NUMBER responds. The reader additionally continues to issue commands describing different PATTERNS and BIT_POINTERS, until it has divided the set of all SERIAL_NUMBERS into two groups: (1) SERIAL_NUMBERS which correspond to unique tags, and (2) sets in which no tag responds.

Advantages of this method include the lack of a need for a memory at the tags that is persistent between commands and a potentially simple comparison mechanism at the tag, and a relatively smaller amount of information being needed to be included in each command.

A4. An Inter-command Tag Memoryless Implementation with Integer Range Commands:

Each tag is associated with a guaranteed unique integer. Each command from a reader specifies two integers, and the tags respond if their number is between the two integers in the command. Each time a response is received the range of integers is divided into two new ranges, and commands are issued to the tag population specifying the new ranges. This process continues until a lack of response identifies ranges in which there are no present tags, and responses to ranges that only include one integer identifying a unique tag.

This process divides the entire serial number space into serial numbers corresponding to unique tags and integer ranges in which no tag responds. Once unique tag serial numbers have been identified, further commands can specify a serial number to guarantee that only one tag at a time will respond, and responses will therefore not collide. Advantages of this method include the lack of a need for a memory at the tags that is persistent between commands, and a small number of commands and responses to identify each tag in a group of random tags from scratch, and the small number of commands and responses that are required to identify new members of a group of random tags.

A 5. An Inter-command Tag Memoryless Implementation Using Integer Ranges, Nonrecursive.

Each tag is associated with a guaranteed unique integer, less than or equal to an integer called MAXIMUM_SERIAL_NUMBER. Each command from a reader specifies two integers, and the tags respond if their number is between the two integers in the command, inclusive.

Figure 7:
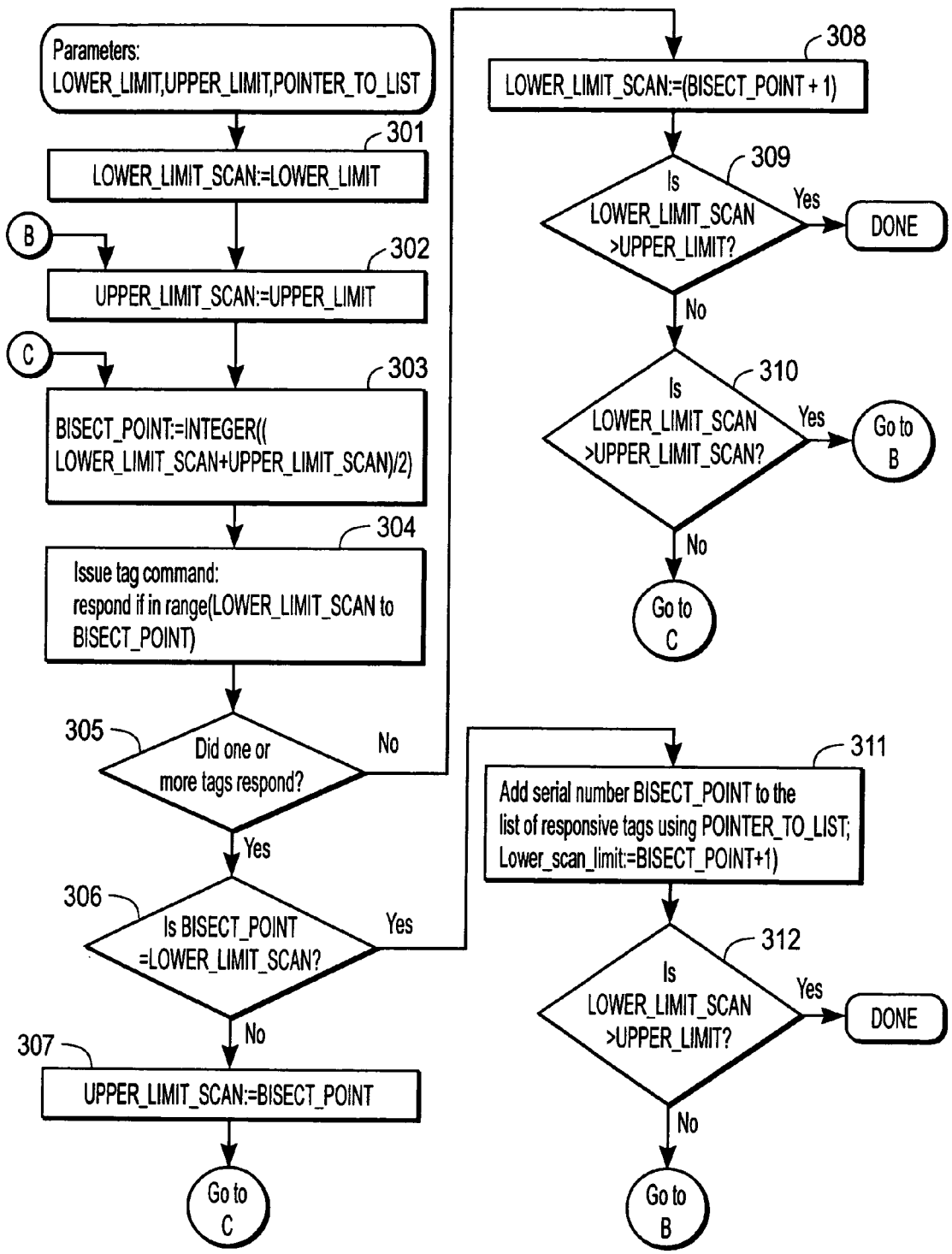
FIG. 7 is a flowchart which shows an exemplary method of another search protocol according to the invention.

The TAG_SEARCH process takes two integer parameters, a LOWER_LIMIT, and an UPPER_LIMIT, and a pointer to a list where responsive tags should be appended. It adds to the list the SERIAL_NUMBERS of all responsive tags with SERIAL_NUMBERS between the limits given, inclusive. The TAG_SEARCH process is shown in FIG. 7.

The variable LOWER_LIMIT_SCAN is set to LOWER_LIMIT in operation 301. The variable UPPER_LIMIT_SCAN is set to UPPER_LIMIT in operation 302. A variable BISECT POINT is set as specified in operation 303. A command is issued in operation 304 to the tags specifying that they are to respond if their serial number is in the range LOWER_LIMIT_SCAN to BISECT POINT, inclusive. If there was no response to the command in operation 304 then from the decision operation 305, processing proceeds to operation 308 in which the variable LOWER_LIMIT_SCAN is set as specified in operation 308 and then operations 309 and 310 follow as shown in FIG. 7. If there was a response as determined in operation 305, then operation 306 follows operation 305 and from the decision point represented by operation 306, either operation 307 follows operation 306 or operations 311 and 312 follow operation 306 as shown in FIG. 7. The circled letters represent jump points; for example, after operation 307, processing proceeds to operation 303. The method is completed when processing reaches "DONE" (from a yes decision at operation 312).

When the process TAG_SEARCH has completed, then it will have created a list of all tags between the limits it was given, inclusive.

If the set of responsive tags is presumed to be slightly changed by the addition or taking away of tags from the responsive population, then TAG_SEARCH can be called with all serial numbers formerly listed for responsive tags, and all intervals in-between serial numbers which were listed, in the order the serial numbers and intervals appear on the list, which will efficiently verify and correct the current list of responsive tags.

A6. A Memoryless Implementation Using Binary Serial Number String and a Bit Number, Binary Search Pattern, and Building a Binary Tree by Recursion Each tag is associated with a guaranteed unique integer expressed as a binary sequence of 1's and 0's called SERIAL_NUMBER (each tag's identifier code). Each command from a reader specifies a PATTERN also being a binary sequence of 1's and 0's, and a BIT_NUMBER. The tags respond if for all of the bits up to BIT_NUMBER, the PATTERN matches the SERIAL_NUMBER. The procedure to identify all tags within physical range of a reader is as follows: A binary tree is created in which each node has pointers to two subnodes UPPER_SUBNODE and LOWER_SUBNODE, and string of binary symbols called PATTERN, and an integer BIT_NUMBER.

Figure 8:
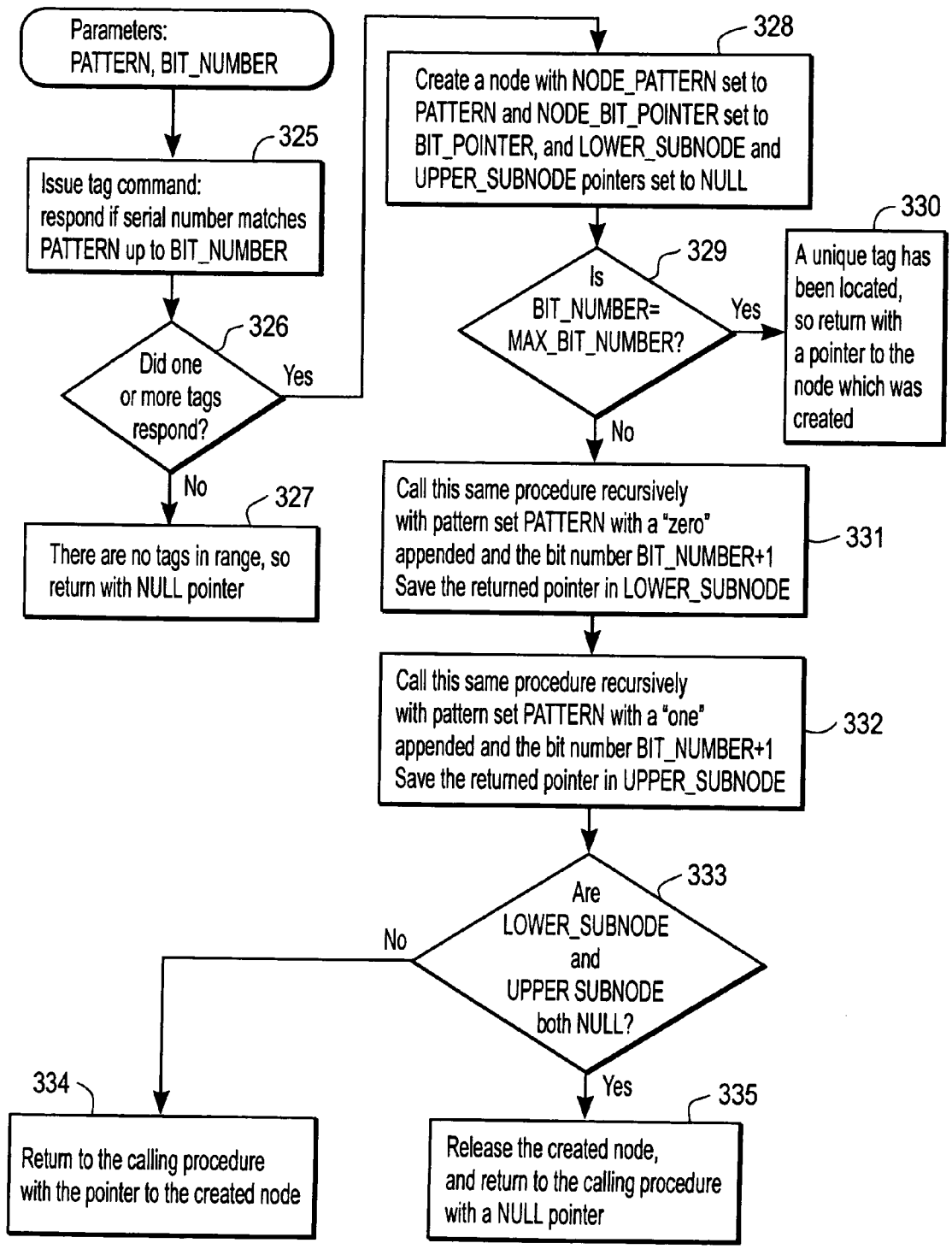
FIG. 8 is a flowchart which shows an exemplary method of another search protocol according to the invention.

Then the following procedure, which is described as a recursive procedure for clarity, is followed, building a binary tree (which is stored in a memory of a processing system in the reader (or coupled to the reader through a network interface, such as an Ethernet interface)). The procedure is called with a string of binary symbols, PATTERN, and an integer BIT_NUMBER. It returns a pointer to a node of a binary tree. FIG. 8 also illustrates this procedure.

A command is issued which specifies the pattern PATTERN and the bit number BIT_NUMBER (operation 325 of FIG. 8). Operation 326 follows operation 325. Operation 326 determines whether there was a response. If there is no response, there are no tags in that range, and the recursive procedure returns with a NULL node pointer (which indicates that there are no tags below this node in the binary tree) in operation 327. If there was a response, operation 328 follows and a node is created with NODE_PATTERN set to PATTERN. If, in operation 329, it is determined that BIT_NUMBER=MAX_BIT_NUMBER, then a unique tag has been identified (operation 330) and the recursive procedure returns (to operation 325) with a pointer to the node created in operation 328. If the test in operation 329 produced a "no," then the recursive procedure is called (back to operation 325) with the pattern set to PATTERN with a "zero" symbol appended and the bit number BIT_NUMBER+1, and the returned node pointer is stored in LOWER_SUBNODE; in operation 332, the recursive procedure is called with the pattern set to PATTERN with a "one" symbol appended and the bit number set to BIT_NUMBER+1, and the returned node pointer is stored in UPPER_SUBNODE. If both LOWER_SUBNODE and UPPER_SUBNODE are NULL (as determined in operation 333), then the current node is released (operation 335), and the recursive procedure returns with a NULL pointer; otherwise a pointer to the current node created in operation 328 is returned in operation 334.

Once the recursive procedure has completed scanning the binary tree, then all of the responsive tags will be catalogued in the binary tree that was built.

Once the binary tree has been created, well-known techniques can be used to walk the tree and extract the list of unique SERIAL_NUMBERs. For example each "leaf node" of the structure corresponds to a unique tag serial number.

B1. An Implementation Utilizing an Inter-command Memory at Each Tag:

Each tag is associated with a guaranteed unique integer. Each tag is capable of retaining information during a sequence of commands. A tag will respond if and only if the following are true:
1) It has received an initiation command.
2) All commands received since the initiation command describe a set of tags of which this tag is a member.

Additional commands issued by the reader modify the set of tags that should respond.

Each time the commands since the initiation command uniquely identify a tag, that unique identification can be used to request responses from the tag while guaranteeing that responses will not collide.

The advantages of this implementation include that less information needs to be sent with each command, because information is derived from previous commands.

B2. A Further Implementation Utilizing an Inter-command Memory at Each Tag:

Each tag is associated with a guaranteed unique number (serial number). Each tag is capable of retaining information during a sequence of commands. Each command identifies information about the serial number. A command specifying overlapping information from a previous command supersedes the older command. Other commands may specify that a tag or tags that fit criteria will no longer respond until another command reactivates it.

A tag will respond if and only if the following are true:
1) It has received an initiation command.
2) The tag's serial number is compatible with the commands issued since the initiation command.

The process starts by issuing an initiation command. Each following command that receives a response may be followed by further commands narrowing the range of tags that can respond. Each command that receives no responses may be followed by commands that change or broaden the range of tags which should respond. Ranges of tags may be specified in many different but fundamentally equivalent ways, and the commands may be issued in many different ways, arriving at the equivalent overall result.

Each time the commands since the initiation command uniquely identify a tag, that unique identification can be used to request responses from the tag while guaranteeing that responses will not collide. The advantages of this implementation include that less information needs to be sent with each command, because information is derived from previous commands.

B3. Another Implementation Utilizing an Inter-command Memory at Each Tag:

Each tag is associated with a guaranteed unique serial number, specified as a sequence of binary symbols. Each tag is capable of retaining information during a sequence of commands. Some commands identify a bit of the serial number, and whether that bit is a 1 or a 0. Other commands may specify that certain bits can take any value. A command specifying overlapping information from previous commands supersedes the older commands. Another type of command may specify that tags whose serial number is compatible with the current commands are not to respond until reactivation is commanded. Each command may depend on the current state of the command sequence to derive the specific features or actions of the command. For example a command may indicate that the "Next bit" is to be a zero, or the "current bit" is to be toggled, or that the "previous bit" may have any state.

A tag will respond if and only if the following are true:
1) It has received an initiation command.
2) The tag's serial number is compatible with the commands issued since the initiation command.

An initiation command is issued, followed by commands that specify particular bits. Each command that receives a response may be followed by further commands narrowing the range of tags that can respond. Each command that receives no responses may be followed by a command that changes or broadens the range of tags which should respond. Bits can be specified in many different equivalent ways, and the commands may be issued in many different ways, arriving at the same overall result.

Each time the commands since the initiation command uniquely identify a tag, the SERIAL_NUMBER is noted and the process continues until the set of available SERIAL_NUMBERS has been divided into two groups, SERIAL_NUMBERS which correspond to tags, and sets of SERIAL_NUMBERS for which no tag responds, and are therefore empty of responsive tags.

The advantages of this implementation include that less information needs to be sent with each command, because information is derived from previous commands, and a therefore potentially compact command structure.

B4. Binary Tree Building Implementation Utilizing Bit by Bit Matching and an Inter-command Memory at Each Tag:

Each tag is associated with a guaranteed unique binary number (serial number), which has at least a specified minimum number of bits, and can end on any one of a specified range of boundaries, for example 64 bits, 80 bits, 96 bits, or any 16 bit boundary, etc. Each tag is capable of retaining information during a sequence of commands, specifically a string of binary bits specifying a partial serial number and a pointer to a current bit. The following commands are available to communicate with the tags:

TAG COMMAND A: increment the bit position pointer and compare the bit pointed to by the bit position pointer to a "zero". Respond if all bits up to and including the current bit match. If they do not match, keep track of the last bit position that matched.

TAG COMMAND B: compare the bit pointed to by the bit pointer to a "one". Respond if all bits up to and including the current bit match. If they do not match, keep track of the last bit position that matched.

TAG COMMAND C: decrement the bit position pointer. If the bit position pointer is less than the number of the last bit position that matched, decrease the variable noting the last bit position that matched accordingly.

TAG COMMAND D: Respond if all bits up to and including the current bit match, and the tag's serial number has no more bits in it.

It should be appreciated by one skilled in the art that there are several other logically related and equally useful combinations of incrementing, decrementing, and comparing bits, and that the order in which bit are compared are arbitrary, etc. The combination of functions such as incrementing the bit pointer and comparing the bit to a zero as in command "A" compacts the command set without reducing the flexibility of the command set, but there are other combinations which work equivalently.

It is also to be recognized that commands A through C are used much more heavily than the other commands, so that an efficient instruction encoding can utilize a minimum number of bits for these common instructions. For example, as few as two bits could be used to encode these three instructions, together with a prefix which is followed by a longer code for the less used instructions.

A data structure for this implementation is created at the reader:
1) A data structure is created which is a binary tree in which each node has pointers to two subnodes, UPPER and LOWER, a current PARTIAL_SERIAL_NUMBER, a current BIT_NUMBER, a Boolean variable which indicates a unique tag has the current partial serial number, called TAG_FOUND, and all Boolean variables initialized at each node creation to FALSE and all integers to zero, and all pointers to null.
2) The current node is set to the initial node of the binary tree. The current PARTIAL_SERIAL_NUMBER is set to zero, and the current BIT_NUMBER is set to zero;
3) An initialization command (such as a reset command to re-enable all tags) is sent to the tag population.

Then the following procedure, which is described as a recursive procedure for clarity, is followed, building the binary tree which may be stored in a memory at the reader.
A. A node is created with the indicated PARTIAL_SERIAL_NUMBER and BIT_NUMBER
B. If the current BIT_NUMBER is on an allowable number of bits, TAG command D is issued which specifies that any tags that match all bits in the current partial SERIAL_NUMBER, and have no further bits in their serial number, are to respond.
   a. If there is a response, then a unique tag has been identified and TAG_FOUND is set to TRUE
C. TAG command A is issued. In an example (see FIGS. 5A, 5B, 5C, and 5D) described below, this command is referred to as a "DOWN" command as it searches down in the binary space of possible tag codes. Tag command A increments the bit pointer, places a "zero" at that binary digit, and specifies that any tags that match all bits in the current partial SERIAL_NUMBER, are to respond.
   a. If there is a response the recursive procedure is called with a partial serial number that is the current serial number with a "zero" appended. The returned node pointer is stored in LOWER_SUBNODE.
D. TAG COMMAND B is issued. In the example of FIGS. 5A-5D, this command is referred to as a "TOGGLE" command. TAG COMMAND B changes the tag binary bit pointed to by the bit pointer to a "one", and any tags that match all bits in the current partial SERIAL_NUMBER, are to respond.
   a. If there is a response the recursive procedure is called with a partial serial number which is the current serial number with a "one" appended. The returned node pointer is stored in UPPER_SUBNODE
E. TAG COMMAND C is sent by the reader to the tags. In the example of FIGS. 5A-5D, this command is referred to as an "UP" command. TAG COMMAND C decrements the tag bit position pointer in all the tags.
F. If (TAG_FOUND is false) and (LOWER is NULL) and (UPPER is NULL), then the current node is released, and the recursive procedure returns with a null pointer.
G. If (TAG_FOUND is TRUE) or (LOWER is not NULL) or (UPPER is not NULL), the recursive procedure returns with a pointer to the current node.

Figure 9:
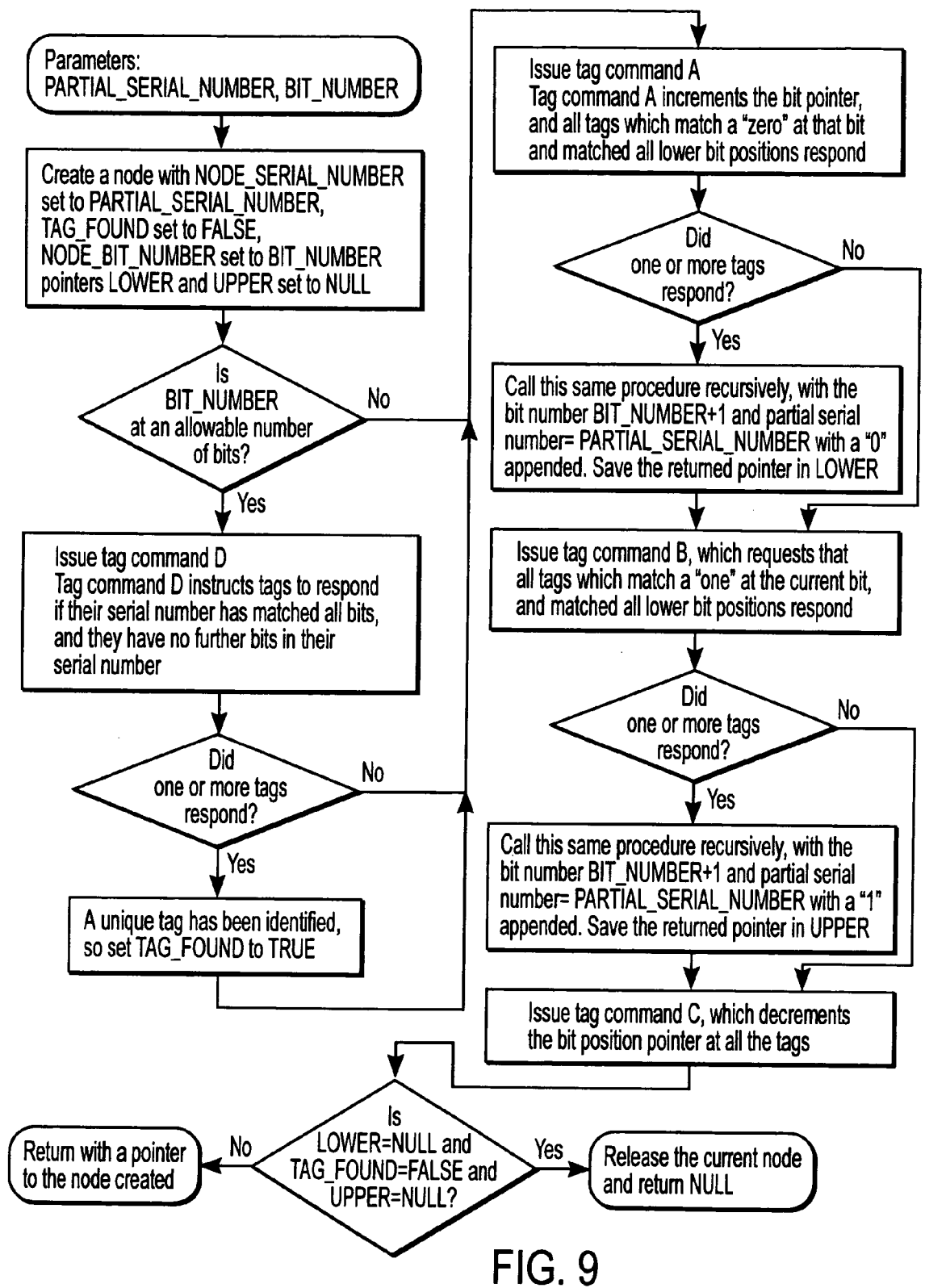
FIG. 9 is a flowchart which shows an exemplary method of another search protocol according to the invention.

Once the recursive procedure has completed scanning the binary tree, then all of the responsive tags will be catalogued in the binary tree that was built. FIG. 9 is a flowchart illustrating an example of this recursive procedure.

This algorithm has the advantages of a compact command encoding, and high speed, especially for tags that have grouped serial numbers. An example of a computer program which uses this algorithm is provided in an Appendix to this description.

Figure 10:
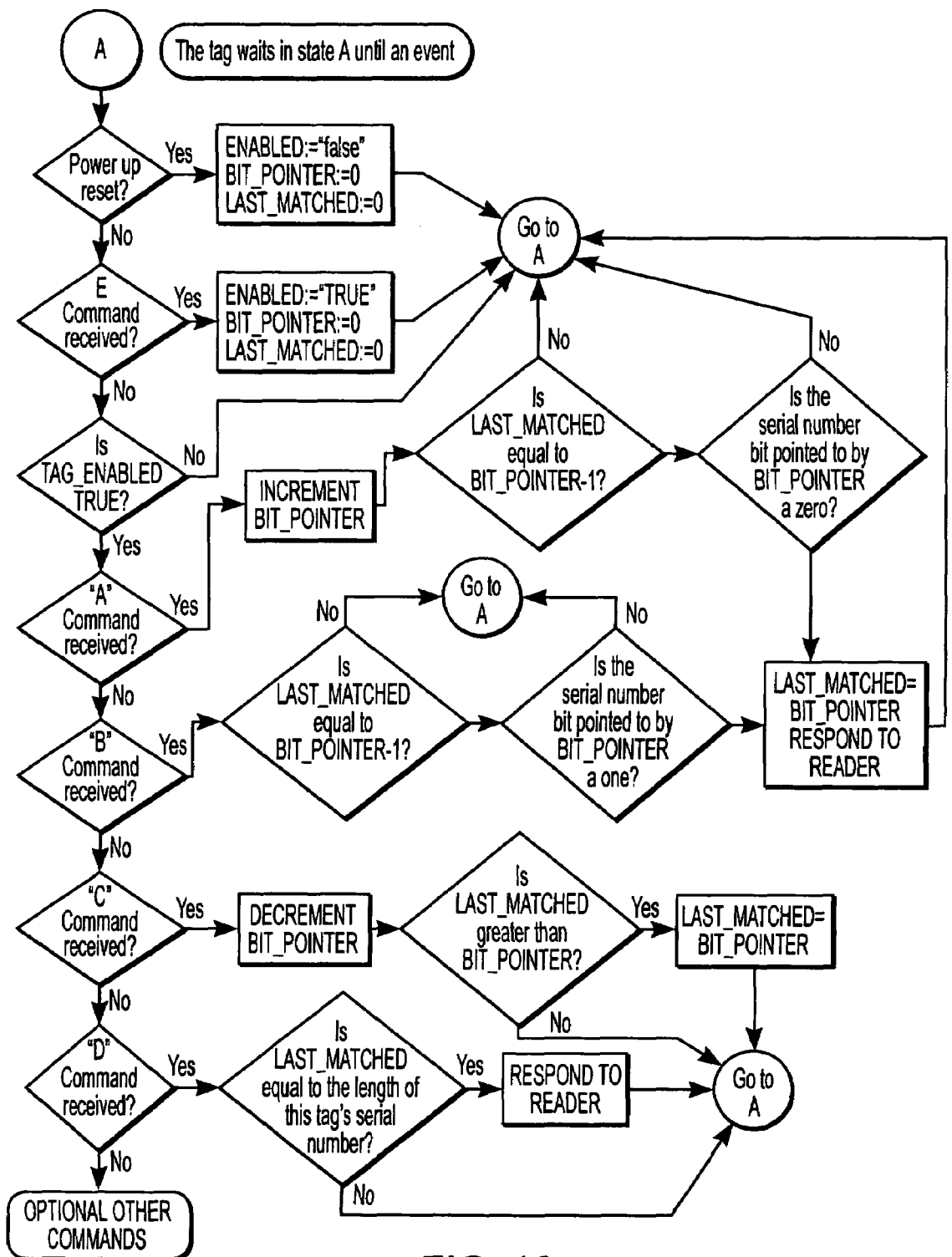
FIG. 10 is a flowchart which shows an exemplary method of another search protocol according to the invention.

An example of this implementation, which builds a binary tree through bit by bit matching, is described further below in conjunction with FIG. 4 (which shows a flowchart of the operation of a tag in this example) and FIGS. 5A, 5B, 5C, and 5D, which show a specific version of the example with 4 tags being found. FIG. 10 shows another flowchart depicting a version of this implementation.

B5. Direct Scan and Mute Implementation Utilizing an Inter-command Memory at Each Tag:

Each tag is associated with a guaranteed unique binary number (serial number), which has at least a specified minimum number of bits, and can end on any one of a specified range of boundaries, for example 64 bits, 80 bits, 96 bits, or any even 16 bit boundary, etc. Each tag is capable of retaining information during a sequence of commands, specifically a string of binary bits specifying a partial serial number and a pointer to a current bit. The following commands are available to communicate with the tags:

TAG COMMAND A: increment the bit position pointer and set the bit pointed to by the bit position pointer to a "zero". Respond if all bits up to and including the current bit match. In the example of this implementation shown in FIG. 6, this command A is referred to as a "DOWN" command.

TAG COMMAND B: set the bit pointed to by the bit pointer to a "one". Respond if all bits up to and including the current bit match. In the example shown in FIG. 6, this command B is referred to as a "TOGGLE" command.

TAG COMMAND C: Respond if all bits up to and including the current bit match, the tag's serial number has no more bits in it, and do not respond to further commands A or B unless commands to the contrary are received. This command mutes a found tag in the example of FIG. 6.

TAG COMMAND D Reset the partial serial number to zero and the bit pointer to zero, and respond if not inactivated by a C command. This command causes the "Go back to top" operation of FIG. 6.

Figure 6:
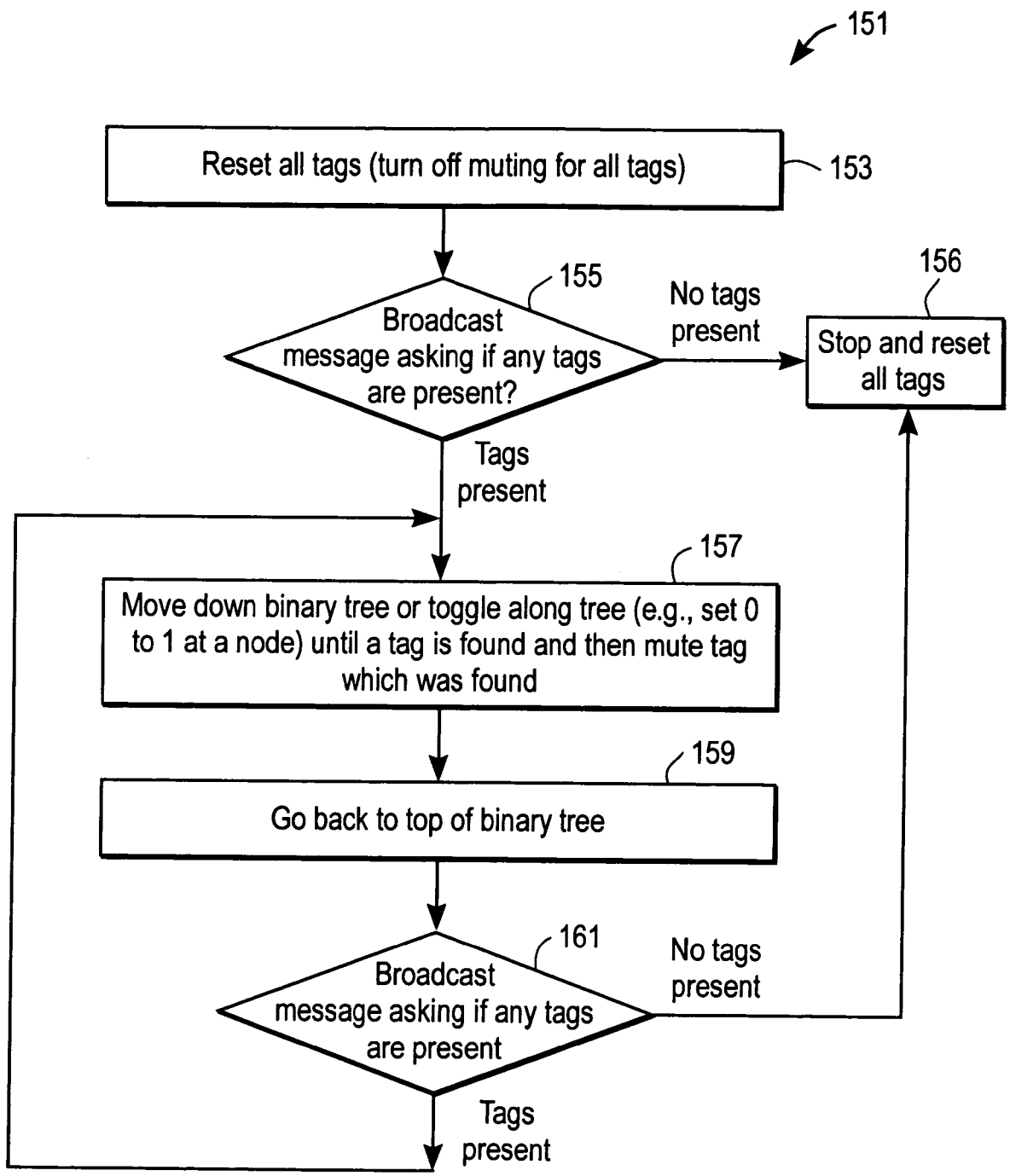
FIG. 6 shows an exemplary method of another search protocol according to one embodiment of the present invention.

TAG COMMAND E: reset and re-enable all tags; this is the reset command shown in FIG. 6.

It should be appreciated by one skilled in the art that this particular set of commands is arbitrary, there are several equally valid combinations of incrementing, decrementing, and comparing bits, the order in which bit sequences are compared are arbitrary, etc. The combination of functions such as incrementing the bit pointer and comparing the bit to a zero as in command "A" compacts the command set without reducing the flexibility of the command set, but is also arbitrary, there are other combinations which work equally well.

It should also be recognized that commands A and B are much more heavily used than the other commands, so that an efficient instruction encoding can utilize a minimum number of bits for these two common instructions. For example, a single bit could be used to encode these two instructions. Instruction C and D and other rarer instructions could be issued by utilizing a separate escape mechanism on the communication channel, for example, a string of missing clock pulses or alternatively, the instructions could be encoded in a Huffman type encoding (e.g. see below).

The following procedure builds a list of valid serial numbers. Procedure of operations A through E:

A. Issue TAG COMMAND E to reset and re-enable all tags and proceed to operation B;
B. If the length of the current partial serial number is at an allowable length for a complete serial number, issue TAG COMMAND C.
   a. If there is a response, add the current partial serial number to the list of valid serial numbers; proceed to operation C;
C. Issue TAG COMMAND A
   a. If there is a response, append a "zero" to the current binary partial serial number and go to operation B; if there is no response, proceed to operation D
D. Issue TAG COMMAND B
   a. If there is a response, append a "one" to the end of the current binary partial serial number and go to operation B; if there is no response, proceed to operation E
E. Issue TAG COMMAND D
   a. If there is a response, go to operation B; if there is no response, then the procedure is completed.

After the execution of this procedure, a list of serial numbers for all responsive tags will have been created. Once this list of serial numbers has been generated, the reader can issue commands to individual tags without fear of channel collisions by utilizing the guaranteed unique serial numbers to interact with individual tags.

This implementation has the advantages of a most compact command encoding, and high speed, especially where there is little correlation between the serial numbers of the tags that are responsive. It also has the advantage of allowing serial numbers that have no predetermined maximum length. The tag mechanism can also be simple, comparing only a single bit at a time, and the only required state information being an enable Boolean, and a bit pointer.

An example of this implementation with muting is shown in FIG. 6 and will be described further below.

Combining Algorithms

A tag population can be made compatible with many different search algorithms at the reader. Tag command sets could be changed by tag commands. Tag commands can also be constructed which dynamically allow the interchangeable use of search algorithms based on efficiency considerations. For example, if tag serial numbers are closely related, for example, many in sequence, then the search algorithm labeled "binary tree building implementation utilizing bit by bit matching and an inter-command memory at each tag" is efficient, but if tag serial numbers are completely uncorrelated, then the search algorithm labeled "direct scan and mute implementation utilizing an inter-command memory at each tag" is usually more efficient and then the reader may change its use of algorithm. If the following set of tag commands or an equivalent is implemented, then readers can use either algorithm, or a combination of search algorithms. For example a reader could switch if it detected many sequential serial numbers in a population or not.

An example of commands for a combined algorithm is:
TAG COMMAND A: increment the bit position pointer and compare the bit pointed to by the bit position pointer to a "zero". Respond if all bits up to and including the current bit match. If they do not match, keep track of the last bit position that matched.
TAG COMMAND B: compare the bit pointed to by the bit pointer to a "one". Respond if all bits up to and including the current bit match. If they do not match, keep track of the last bit position that matched.

TAG COMMAND C: decrement the bit position pointer. If the bit position pointer is less than the number of the last bit position that matched, decrease the variable noting the last bit position that matched accordingly.

TAG COMMAND D: Respond if all bits up to and including the current bit match, and the tag's serial number has no more bits in it.

TAG COMMAND E: Respond if all bits up to and including the current bit match, the tag's serial number has no more bits in it, and do not respond to further commands A or B unless commands to the contrary are received.

TAG COMMAND F Reset the partial serial number to zero and the bit pointer to zero, and respond if not inactivated by an E command.

TAG COMMAND G: reset and re-enable all tags

Command Encoding

There are many equivalent command sets, and many equivalent or similar methods of encoding the commands, but analysis shows that the stream of commands generated by search can be highly biased toward a few commands. For example, the "direct scan and mute implementation utilizing an inter-command memory at each tag" issues tag command A about twice as often as tag command B, and other commands occur as seldom as once per found tag, with 64 bit tags, they would appear approximately once every 96 commands, for example. A modified static Huffman encoding of the tag instructions that could be decoded by a simple state machine at the tag is the following:

| Command | Symbol | Bits per Symbol | population percentage | contribution |
| --- | --- | --- | --- | --- |
| Tag command A: | "1" | 1 | 64 | .64 |
| Tag command B: | "00" | 2 | 32 | .64 |
| Tag command C: | "0100" | 4 | 1 | .04 |
| Tag command D: | "0101" | 4 | 1 | .04 |
| Tag command F: | "0110" | 4 | 1 | .04 |
| Tag command F: | "0111" | 4 | 1 | .04 |
| Total | | | | 1.44 bits/symbol |

So this command-encoding scheme could result in an average of less than 1.5 bits/symbol without any out of channel escape.

FIG. 4 shows one example of a method performed by one or more tags in the vicinity of a reader. The method 121 begins in operation 123 in which each tag responds to an optional test code. If the tag fails to fully receive the test code, then it may be automatically silenced by the logic within the tag. The test code may be a predetermined code stored in each tag. The test code stored in the tag may be compared to a test signal received from the reader. If the communication signal is adequate, then the tag will properly receive the entire test code from the reader and be able to correctly match it to the tag's own internally stored test code to verify that the two test codes match. If they do not match, then this indicates that the communication medium is poor and thus the tag may automatically silence itself without receiving a command from the reader. It will be appreciated that the reader can reset any and all tags in order to unsilence a tag in order to perform another test operation.

In operation 125, the tag's receiving register, such as the register 51 shown in FIG. 2B, is reset. This typically involves setting the bit pointer to the most significant bit of the register. Then in operation 127, the tag receives, in series over time, data from the reader. In operation 129 the tag correlates, in series over time, the received data from the reader to the tag's internally stored identification code. If the correlation operation over time reveals that there are matches, then the tag, in operation 131, responds in series over time with the match signal, indicating there is a match for each bit by bit correlation. If in operation 133 the reader determines that a full (all bits) match for a tag exists, then the reader may optionally transmit an error detection message, such as a parity check or a checksum on the tag's stored code. The tag can then confirm to the reader that the identified tag's identification code has been properly received by the reader by sending a confirmation signal. If the reader has not properly received the identification code, then the tag will silence itself and hence not respond to the reader. The lack of response will typically cause the reader to remove the tag's identification code from the list of identified tags. Following operation 133, the tag in operation 135 may be silenced for a period of time by muting the tag through a command from the reader.

Figure 5C:
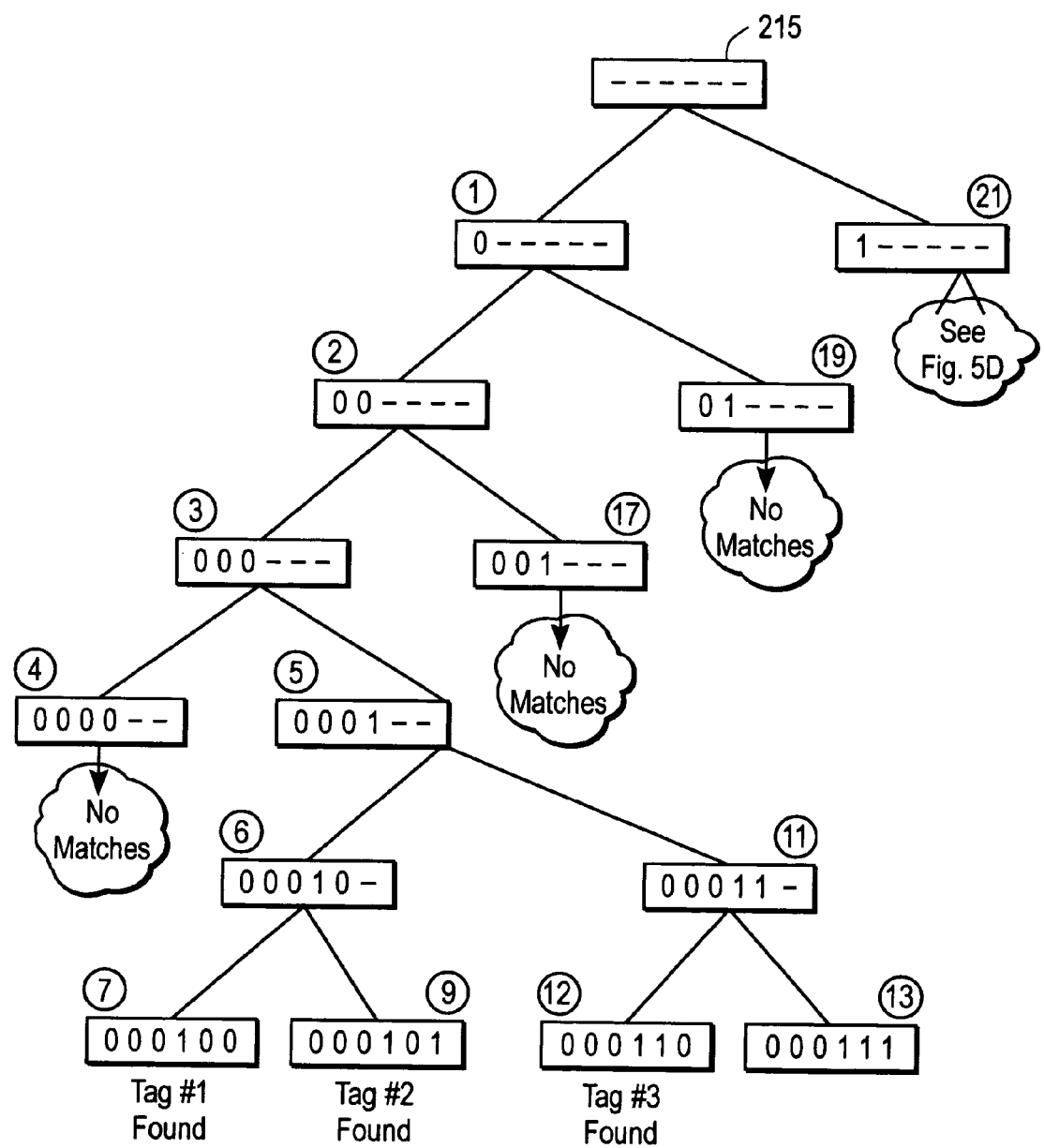
FIGS. 5C and 5D show the resulting binary tree created from the search protocol of FIGS. 5A and 5B.
Figure 5D:
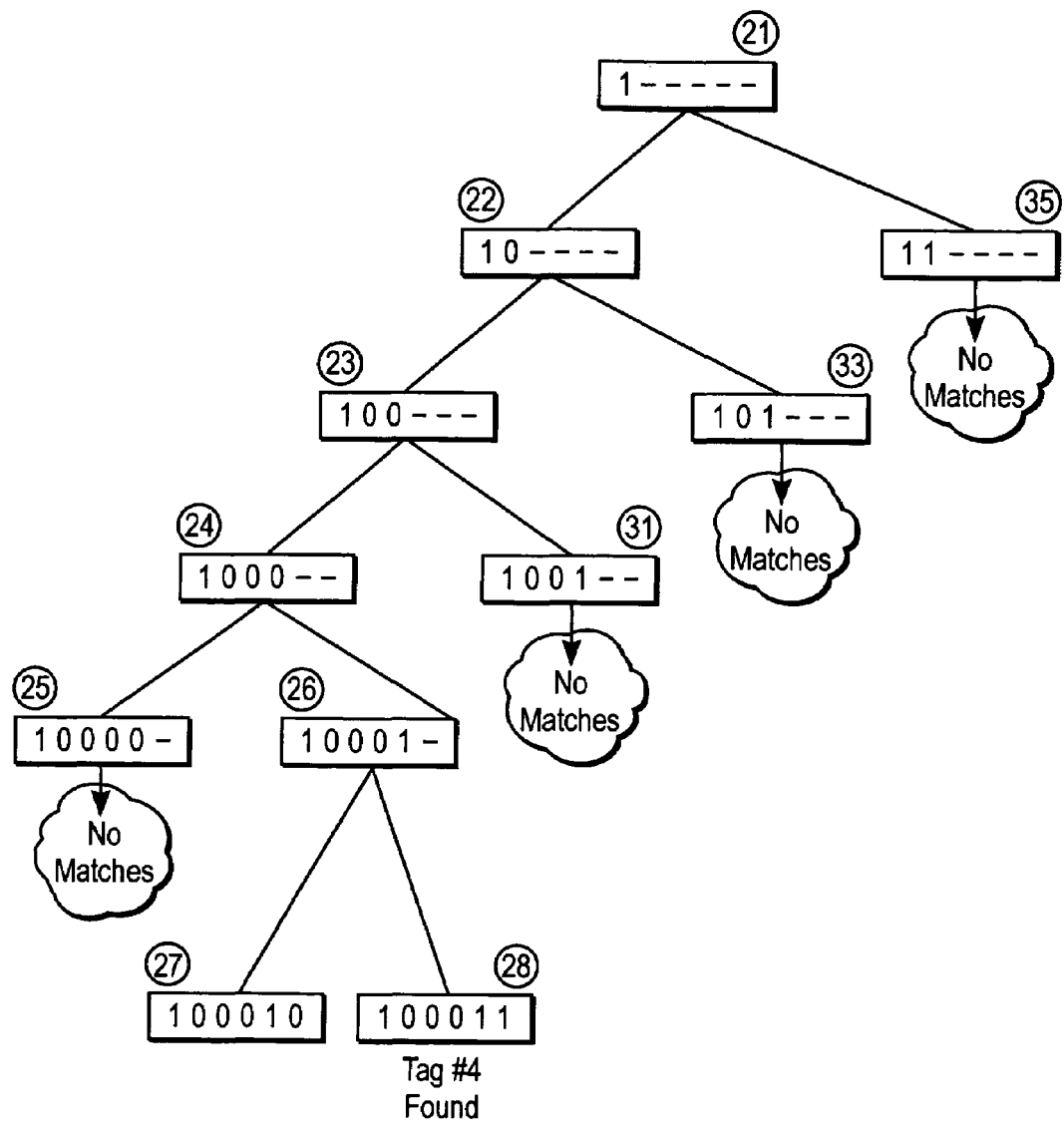

FIGS. 5A, 5B, 5C, and 5D show a particular example of an implementation according to the invention which uses tags with an intercommand memory, and a bit by bit correlation operation which results in building of a binary tree. FIGS. 5A and 5B show a chart indicating a sequence of commands, each at a given search time label shown in column 201, which results in a change in each input correlator register of each tag. This change is also reflected in the reader's memory, which replicates the status of each tags' input correlator register, as shown in column 205. Column 203 represents the search command from the reader for each corresponding search time label shown in column 201. Columns 207, 209, 211, and 213 represent the response from each of four tags which have unique codes as shown in FIG. 5A. Each search command, at each search time label, results in the creation of a binary tree, such as the binary tree shown in FIGS. 5C and 5D which correspond to the specific search operation shown in FIGS. 5A and 5B for the four tags also indicated in FIG. 5A. The search for tag ID's begins at search time label 1; at this time the reader issues a DOWN command shown in column 203 which causes the reader's memory for each tag's input correlator register to be modified as shown in column 205 (to have the value 0 - - -) and also causes the binary tree to start to be created by moving from the root position 215 to the node labeled with search time label 1 in FIG. 5C. The search command, when it reaches the tags, causes each tag's input correlator register, such as register 51 of FIG. 2B, to have the value set by the command, in this case 0 - - - which is shown by search time label 1 in FIG. 5C and along the row with the search time label 1 in FIG. 5A. The correlation operations at 4 tags result in the four responses shown on the row labeled with search time label 1, where there are three match responses from tags 1, 2, and 3 and no response from tag 4. Then the reader issues another DOWN command as shown in column 203 at search time label 2, resulting in the reader's memory reflecting each tag's input correlator register value as 00 - - - . At the same time the reader continues building a binary tree, resulting in the creation of the node shown in FIG. 5C with the search time label 2. Again, tags 1, 2, and 3 respond with matches while tag 4 does not respond. The reader continues to sequence through the commands at each search time label, resulting in the updating of the reader's memory of each tag's input correlator register as well as each tag's input correlator register being updated, which results in the response shown along each corresponding row. At the same time, the reader continues to build a binary tree as it works down the tree. The reader maintains the list of nodes under which there are no matches, such as node 4 represented by search time label 4 on FIG. 5C as well as the nodes represented on FIG. 5C by the search time labels 17 and 19. Furthermore, the reader knows when it has reached the bottom of each portion of each binary tree, such as the nodes represented by search time labels 7, 9, 12, and 13. In this manner, the reader can intelligently determine what portions of the binary tree have been searched and do not need further searching. This allows the reader to sequence up the binary tree when necessary to continue searching through other portions of the tree. An example of this can be seen at various places in the tree, such as at the node represented by search time label 13 which resulted from a TOGGLE command as shown in FIG. 5A in which there were no matches. At this point, the reader issues 3 UP commands in sequence (at search time labels 14, 15, and 16). It will be appreciated that in one embodiment, certain of the tags are responding to these commands by indicating matches, but these matches are effectively ignored by the reader as the reader can determine from prior search commands and responses that the tags which are responding are in a binary space which have been previously searched. The reader continues to issue commands at each search time label as shown in FIGS. 5A and 5B to complete a creation of a binary tree which is shown in FIGS. 5C and 5D.

It will be appreciated that in some embodiments a linked list may be used instead of a binary tree; this alternative data structure would normally maintain a list of tags which have had their identification codes determined and maintain a description of those portions of the searched number space in which there are no tags.

As explained above, the DOWN command causes the bit pointer which points to the tag's input correlator register to move down to the next lower least significant bit and place a 0 at that bit location, where the remaining lower least significant bits are effectively masked (for comparison purposes) in both the tag's input correlator register as well as the tag's internal identification code storage. The masking of these lower least significant bits means that they are not involved in the correlation comparison which occurs on a bit by bit basis between the two registers. The TOGGLE command toggles the bit in the current least significant bit location from 0 to 1. The UP command moves the bit pointer from the current least significant bit location to the next higher significant bit. An example of the UP command can be shown at search time label 10 in which the current least significant bit is moved from bit position 0 to bit position 1, leaving the bit at bit position 0 masked in both the tag's input correlator register as well as the tag's identification code stored internally at the tag.

FIG. 6 shows one example of a search method which involves the building of a binary tree and muting of tags which have been found. In this example, a method 151 begins in operation 153 in which all tags are reset by a command from the reader; also, if necessary, all muting for all tags is turned off. Then in operation 155, a broadcast message is sent asking if any tags are present. If no tags are present, then operation 156 occurs and all tags are reset and the reader becomes quiescent for at least a temporary period of time. If tags are present, then, from operation 155, the method proceeds to operation 157 which in fact represents multiple operations over time in the process of moving down or across (toggle) along a binary tree until a tag is found; when the tag is found it is then muted, and then the process goes back up to the top of the binary tree in operation 159 and a broadcast message in operation 161 is transmitted to see if any tags are still present. If no tags are present at this point, then operation 156 follows. On the other hand, if tags are present, then processing returns to operation 157 to continue traversing through the binary tree to find and then mute tags through the process. An alternative of the method of FIG. 6 may be used without creating a binary tree or other data structure.

Another Binary Tree Building Implementation Utilizing Bit by Bit Matching, the Up Command Enhanced with a Response, and an Inter-command Memory at Each Tag.

Each tag is associated with a guaranteed unique binary number (serial number), which has at least a specified minimum number of bits, and can end on any one of a specified range of boundaries, for example 64 bits, 80 bits, 96 bits, or any 16 bit boundary, etc. Each tag is capable of retaining information during a sequence of commands, specifically a string of binary bits specifying a partial serial number and a pointer to a current bit. The following commands are available to communicate with the tags:

TAG COMMAND A: increment the bit position pointer and compare the bit pointed to by the bit position pointer to a "zero". Respond if all bits up to and including the current bit match. If they do not match, keep track of the last bit position that matched.

TAG COMMAND B: compare the bit pointed to by the bit pointer to a "one". Respond if all bits up to and including the current bit match. If they do not match, keep track of the last bit position that matched.

TAG COMMAND C: decrement the bit position pointer. Respond if the next bit (at the decremented position) is a one and all previous bits match. If the bit position pointer is less than the number of the last bit position that matched, decrease the variable noting the last bit position that matched accordingly.

TAG COMMAND D: Respond if all bits up to and including the current bit match, and the tag's serial number has no more bits in it.

It should be appreciated by one skilled in the art that there are several other logically related and equally useful combinations of incrementing, decrementing, and comparing bits, and that the order in which bit are compared are arbitrary, etc. The combination of functions such as incrementing the bit pointer and comparing the bit to a zero as in command "A" compacts the command set without reducing the flexibility of the command set, but is there are other combinations which work equivalently.

It is also to be recognized that commands A through C are used much more heavily used than the other commands, so that an efficient instruction encoding can utilize a minimum number of bits for these common instructions. For example, as few as two bits could be used to encode these three instructions, together with a prefix which is followed by a longer code for the less used instructions.

1) A data structure is created which is a binary tree in which each node has pointers to two subnodes, UPPER and LOWER, a current PARTIAL_SERIAL_NUMBER, a current BIT_NUMBER, a Boolean variable which indicates a unique tag has the current partial serial number, called TAG_FOUND, and all Boolean variables initialized at each node creation to FALSE and all integers to zero, and all pointers to null.

2) The current node is set to the initial node of the binary tree. The current PARTIAL_SERIAL_NUMBER is set to zero, and the current BIT_NUMBER is set to zero Then the following procedure, which is described as a recursive procedure for clarity, is followed, building the binary tree in the following operations.

A. A node is created with the indicated PARTIAL_SERIAL_NUMBER and BIT_NUMBER, and proceed to operation B
B. If the current BIT_NUMBER is on an allowable number of bits, TAG command D is issued which specifies that any tags that match all bits in the current partial SERIAL_NUMBER, and have no further bits in their serial number, are to respond.
   a. If there is a response, then a unique tag has been identified and TAG_FOUND is set to TRUE
   b. Proceed to operation C
C. TAG command A is issued. Tag command A increments the bit pointer, places a "zero" at that binary digit, and specifies that any tags that match all bits in the current partial SERIAL_NUMBER, are to respond.
   a. If there is a response the recursive procedure is called with a partial serial number that is the current serial number with a "zero" appended. The returned node pointer is stored in LOWER_SUBNODE
   b. If the recursive procedure indicates that there was a response to its tag command C, skip to operation E, otherwise, proceed to operation D
D. TAG COMMAND B is issued. TAG COMMAND B changes the tag binary bit pointed to by the bit pointer to a "one", and any tags that match all bits in the current partial SERIAL_NUMBER, are to respond.
   a. If there is a response the recursive procedure is called with a partial serial number which is the current serial number with a "one" appended. The returned node pointer is stored in UPPER_SUBNODE
   b. Proceed to operation E
E. TAG COMMAND C is sent by the reader to the tags. TAG COMMAND C decrements the tag bit position pointer in all the tags. The tags respond if their next bit is a "1", and the lesser bits match. The response of the tags, or lack of response is recorded for return to the calling procedure, and proceed to operation F.
F. If (TAG_FOUND is false) and (LOWER is NULL) and (UPPER is NULL), then the current node is released, and the recursive procedure returns with a null pointer, otherwise proceed to operation G.
G. Return with a pointer to the current node.

Once the recursive procedure has completed scanning the binary tree, then all of the responsive tags will be catalogued in the binary tree that was built.

This algorithm has the advantages of a compact command encoding, and high speed, especially for tags that have grouped serial numbers. With a slight increase in tag complexity to handle the enhanced tag command C, fewer commands are needed to scan the tags. The enhanced tag command C may be considered a combination of the UP and TOGGLE commands of FIGS. 5A-5D. The UP and TOGGLE commands are enhanced in that they occur in one operation (with enhanced command C) rather than two operations as in FIG. 5A (e.g. see labels 10 and 11 of FIG. 5A which require two operations, whereas with the enhanced tag command C only one operation is required to both go "UP" and "TOGGLE").

Direct Scan and Mute Implementation with No Extra Bit Checking in the Down Search, and Utilizing an Intercommand Memory at Each Tag:

Each tag is associated with a guaranteed unique binary number (serial number), which has at least a specified minimum number of bits, and can end on any one of a specified range of boundaries, for example 64 bits, 80 bits, 96 bits, or any even 16 bit boundary, etc. Each tag is capable of retaining information during a sequence of commands, specifically a string of binary bits specifying a partial serial number and a pointer to a current bit. The following commands are available to communicate with the tags:

TAG COMMAND A: Increment the bit position pointer and set the bit pointed to by the bit position pointer to a "zero". Respond if all bits up to and including the current bit match.

TAG COMMAND B: set the bit pointed to by the bit pointer to a "one", and compare it. Increment the bit position pointer and set the bit pointed to by the bit position pointer to a "zero" and compare it. Respond if all bits up to and including the current bit match.

TAG COMMAND C: Respond if all bits up to and including the current bit match, the last bit is a "0", and the tag's serial number has no more bits in it, and do not respond to further commands A or B unless commands to the contrary are received.

TAG COMMAND D: Respond if all bits up to and including the current bit match, the last bit is a "1", the tag's serial number has no more bits in it, and do not respond to further commands A or B unless commands to the contrary are received.

TAG COMMAND E: Reset the partial serial number to zero and the bit pointer to zero, and respond if not inactivated by a C command.

TAG COMMAND F: reset and re-enable all tags

It should be obvious to one skilled in the art that this particular set of commands is arbitrary, there are several equally valid combinations of incrementing, decrementing, and comparing bits, the order in which bit sequences are compared are arbitrary, etc. The combination of functions such as incrementing the bit pointer and comparing the bit to a zero as in command "A" compacts the command set without reducing the flexibility of the command set, but is also arbitrary, there are other combinations which work equally well.

It should also be recognized that commands A and B are much more heavily used than the other commands, so that an efficient instruction encoding can utilize a minimum number of bits for these two common instructions. For example, a single bit could be used to encode these two instructions. Instruction C and D and other rarer instructions could be issued by utilizing a separate escape mechanism on the communication channel, for example, a string of missing clock pulses. Alternatively, a modified Huffman encoding could be used for the command set.

The following procedure builds a list of valid serial numbers through the specified operations.

Procedure:
A. Issue TAG COMMAND E to reset and re-enable all tags, proceed to operation B.
B. If the length of the current partial serial number is one less than an allowable length for a complete serial number
   a. Issue TAG COMMAND C.
   b. If there is a response, add the current partial serial number with a "0" appended, to the list of valid serial numbers
   c. Issue TAG COMMAND D
   d. If there is a response, add the current partial serial number with a "1" appended, to the list of valid serial numbers
   e. Proceed to operation C C. Issue TAG COMMAND A
   a. If there is a response, append "0" to the current binary partial serial number and go to operation B
   b. Otherwise go to operation D
D. Issue TAG COMMAND B
   a. If there is a response, append a "10" to the end of the current binary partial serial number and go to operation B
   b. Otherwise, go to operation E
E. Issue TAG COMMAND D
   a. If there is a response, go to operation B
   b. Otherwise, the procedure is done After the execution of this procedure, a list of serial numbers for all responsive tags will have been created. Once this list of serial numbers has been generated, the reader can issue commands to individual tags without fear of channel collisions by utilizing the guaranteed unique serial numbers to interact with individual tags.

This implementation has the advantages of a most compact command encoding, and high speed, especially where there is little correlation between the serial numbers of the tags that are responsive. It also has the advantage of allowing serial numbers that have no predetermined maximum length. The only required state information being an enable Boolean, and a bit pointer. With a small additional complexity at the tag for the implementation of the enhanced "B" command, the number of commands needed to find each tag is reduced.

Implementations Using Neighborhood Searching with Muting

Another embodiment of the invention uses what may be characterized as neighborhood searching where several tags around a reader may have identifier codes which are all clustered in a small portion of a number space. An example of such a clustering is shown in FIGS. 5A and 5C where tags #1, #2 and #3 are clustered together at a portion of the binary tree shown in FIG. 5C. One implementation of this embodiment would require each tag to store a value at a generally predetermined bit location (which may be referred to as a neighborhood bit match). A reader would know this bit location and each tag would store a match or no match value at this bit location. In a typical example, if the tags' identifier code length is 64 bits then the 60th bit (4 bits away from the Least Significant Bit (LSB)) may be designated as this neighborhood bit location. Each tag would also store the current bit location in a binary search algorithm as in the example shown in FIGS. 5A-5D. The search algorithm of this implementation would search down a binary tree by using the DOWN and TOGGLE commands; in one situation, this could be accomplished by the reader transmitting a single bit (e.g. 0=DOWN; 1=TOGGLE) and transmitting additional bits (using, for example, Huffman encoding) when required to give additional commands. This implementation resembles the method shown in FIG. 6 in that the search works down the tree and mutes a found/identified tag, but rather than going all the way back up the tree as in operation 159, the reader knows to resume a DOWN search starting at the neighborhood bit location if it gets a positive response to a command which asks if there are any tags which have a match at the neighborhood bit location. Each tag stores a match at the Neighborhood Bit Location (NBL) if all prior bits (and optionally the neighborhood bit location itself) have a match up until this bit location in the search process. In the example of FIG. 5A, if the tags of FIG. 5A had this feature and if the neighborhood bit location was the 4th bit (shown as having a "0" at search time label and being next to the LSB), then tags #1 and #2 of FIG. 5A would store, at search time label 6, a "match" for the neighborhood bit location while tags #3 and #4 would store "no match." A positive response to the reader's command asking if there are any tags which have a match at the NBL (after having muted all previously found tags at least in the "neighborhood") means that there are unfound/unidentified tags in this portion (or "neighborhood") of the binary tree space which need to be found before going back up to the top of the binary tree for further searching down the tree. Thus, a positive response (to "any tags with NBL=match") causes the reader to issue commands to continue to search the number space delineated by the NBL. If there are no positive responses, then the reader may go back up to the top of the binary tree and resume a binary search through those portions of the tree which have not been searched. As in the case of FIG. 6, the reader, after having gone back to the top of the tree, may broadcast a message (assuming all found tags are still muted) as in operation 161. If unfound/unidentified tags are still present, the reader resumes a down search through the tree using the DOWN and TOGGLE commands, muting tags which are identified and, as before, tags store match or no match at the NBL to allow the reader to perform a neighborhood search before going back up to the top of the tree. It can be seen that this implementation uses a bit by bit comparison at the tag based on commands issued by the reader and that the tag at least stores a value indicating whether all previous bits have matched and a value indicating whether the current bit matches and also stores a value for the NBL.

An alternative to this implementation uses a storage in each tag which indicates where (in any possible location along the length of a tag's identifier code) the tag first failed to match (First Failed Bit Location—FFBL). Reader commands which search below this location are not responded to by the tag (which mutes itself by comparing the current bit location being searched to the FFBL and if the current bit location is further down the tree then the tag is silenced). As the reader completes a search down the remainder of this portion of the tree and then begins to come up the tree, this self muted tag will un-mute itself when the current bit location reaches the FFBL and the reader begins to search down from this location rather than going all the way up the tree. In this alternative, the tag uses an intercommand memory which stores the current bit location being compared and a cumulative bit match value (indicating whether or not all previous bits matched in the search process).

It is envisioned that a tag or tags may be placed on various different types of objects, such as products in a stream of commerce, and that such tag or tags may be used with any of the various foregoing embodiments. For example, unique tags may be placed on products (e.g. cereal boxes, diaper packages, cans of soup, etc.) in a grocery store or supermarket. Typically, the manufacturer (e.g. Campbell's Soup or Kelloggs) would place a unique tag on each package of a product, and this tag can then be used to maintain an inventory in a warehouse or on a truck (or other shipping entity) or in a store (e.g. grocery store or supermarket or clothing store, etc.). Further, the tag may be used to "checkout" the product from a store (in a manner which is similar to the conventional use of printed bar codes on products, which bar codes are scanned at a point of purchase such as a checkout counter in a supermarket). Whether maintaining an inventory or checking out products, the tag is read by a reader to obtain the tag's unique code which in turn, through a lookup operation in a database which associates the code with other information such as product name, product specifications, retail price, etc., can be used to identify the product. It will be appreciated that each tag for each sample of a product (e.g. each box of Frosted Flakes cereal) may have a unique identifier code or that tags intended for the same product (e.g. each 16 oz. box of Frosted Flakes cereal) have the same identifier code.

Tags may be placed on household appliances, such as toasters, coffeemakers, TVs, DVD players, etc., and when the appliance, with its tag, is brought into a household, a reader may interrogate the tag which can then be configured to work with other appliances in the household (particularly one in which there is a local area network (LAN) or a local operating network (LON)).

Communication with tags (e.g. between tag and reader) need not be only wireless. The communication medium may be wireless or wired. For example, a wired connection over household power lines or a bus may be used rather than a wireless connection.

Some of the above noted algorithms bisect a number space in order to search for tags. It will be appreciated that other divisions of a number space may be more efficient. Thus rather than bisecting (dividing by 2) a number space (which produces a large bisected space to search when the space is initially very large, such as $2^{64}$ possible tag identifier codes), algorithms of the invention may split the space into smaller portions (e.g. $\frac{1}{50}^{th}$ or $\frac{1}{100}^{th}$ of the number space and search these smaller portions).

Some of the embodiments noted above perform a correlation operation in the tag by receiving data, over time from the reader, and correlating that data with the tag's identification code. FIG. 4 shows one exemplary embodiment which performs this correlation over time after receiving data. In general, this involves receiving a first data from a reader (e.g. one or more bits of a code) which is then correlated with a first corresponding portion of the tag's identification code. If there is a match, the tag responds with a response which indicates the match and then receives second data (e.g. one or more bits of the code), from the reader, which is correlated with a second corresponding portion of the identification code. The second data, when transmitted to the tag, may include or not include the first data depending upon the implementation. If the tag has memory for storing the first data (or whether the first data matched its corresponding portion) then the tag does not normally need to receive the first data again. In this case, the tag can use a locally stored copy of the first data with the second data to correlate with the corresponding part of the tag's identification code or the tag may have stored an indication of the matching portion from prior correlations to avoid repeating a correlation of this matching portion from prior correlations. On the other hand, if the tag does not include such memory, then the reader would normally retransmit the first data as part of the second data and the tag would use both the first data and the second data to correlate to the tag's identification code.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

APPENDIX A

```
//////////////////////////////////////////////////////////
// tagtree.cpp --
//
//              C++ Demonstration code for the tag search algorithm labeled:
//
//              Binary tree building implementation
//                      utilizing bit by bit matching and
//                              inter-command memory at each tag
//
//              In this simulator, tags are listed one per line in an input file
//              as a string of 1's and 0's. In this implementation, tags may have
//              serial numbers of any length (up to MAXBITS) , for ease in simulating
//              lots of short tags for hand analysis. A real world implementation would
//              probably require a minimum tag length of 32, 64, or more, and would
//              probably only allow tags to end on predefined boundaries.
//              this simulation only simulates the search algorithm, and does not
//              contain initialization commands, error checking etc.
//
//
//////////////////////////////////////////////////////////
#include <stdio.h>
#include <string.h>
#include <vector>
// Define the maximum number of bits that can be used to represent
// a tag device.
#define MAXBITS 256
//////////////////////////////////////////////////////////
// class Tag --
//              Defines the factory for Tag objects. Each tag represents
//              a single tag device with a unique identifier. The class
```

-continued

APPENDIX A

```
//                    maintains a global list of all active tags. Each of the
//                    SendCommand* methods iterates over all of the active tags.
//////////////////////////////////////////////////////////////////////
class Tag {
public:
    static void AddTag (const char* id);
    static bool SendCommandA( );
    static bool SendCommandB( );
    static void SendCommandC( );
    static bool SendCommandD( );
private:
    Tag (const char* str);              // constructs a tag object for simulation
    ~Tag( );                             // destructs a tag object, releasing memory
    // used to send a command to all tags
    bool CompareNextToZero( );          // Tag Command A simulator
    bool CompareToOne( );               // Tag Command B simulator
    void Decrement( );                  // Tag Command C simulator
    bool IsMatch( );                    // Tag Command D simulator
    char* serial;                       // Unique id of tag, contains '0' and '1'
    // characters
    int length;                         // Length of tag
    int position;                       // Current index into serial number
    int lastMatch;                      // Last successfully compared bit position
};
static std::vector<Tag*> allTags; // array of all tags in the system
void
Tag::AddTag(const char* id)
// test code used to put tags into the simulator
{
    printf("adding: %s\n", id);
    allTags.push_back(new Tag(id));
}
bool
Tag::SendCommandA( )
// test code used to send command A to all the simulated tags
//     the response of all tags is ORed into a single response
//         this code will be replaced by the code to send an actual signal
//         to hardware tags, and read their joint response
{
    bool result = false;
    for (int i = 0; i < allTags.size( ); i++) {
        result |= (allTags [i]->CompareNextToZero( ));
    }
            printf("Command A--downsearch %s\n",
                    result ? "Tag(s) respond" : "no response");
    return result;
}
bool
Tag::SendCommandB( )
// test code used to send command B to all the simulated tags
//     the response of all tags is ORed into a single response
//         this code will be replaced by the code to send an actual signal
//         to hardware tags, and read their joint response
{
    bool result = false;
    for (int i = 0; i < allTags.size( ); i++) {
        result |= (allTags[i]->CompareToOne( ));
    }
            printf("Command B--sidesearch %s\n",
                    result ? "Tag(s) respond" : "no response");
    return result;
}
void
Tag::SendCommandC( )
// test code used to send command C to all the simulated tags
{
    for (int i = 0; i < allTags.size( ); i++) {
        allTags[i]->Decrement( );
    }
            printf("Command C upsearch\n");
}
bool
```

-continued

APPENDIX A

```
Tag::SendCommandD( )
// test code used to send command D to all the simulated tags
//      the response of all tags is ORed into a single response
{
    bool result = false;
    for (int i = 0; i < allTags.size( ); i++) {
        result |= (allTags[i]->IsMatch( )) ;
    }
//printf("Command D %s\n", result ? "Tag(s) respond" : "no response");
    if (result){ printf("TAG FOUND-->");}
    return result;
}
Tag::Tag(const char* str) :
// constructs a tag object, allocating memory
    length(strlen(str)),
    position(-1),
    lastMatch(-1)
{
    serial = strdup(str);
}
Tag::~Tag( )
// destructs a tag object, releasing the memory
{
    delete serial;
}
bool
Tag::CompareNextToZero( )
// --these instructions simulate each tag's execution of command A
//        command A asks the tags to append a "zero" to the current code,
//        and to respond if the code matches
//            the serial number up to that point
//
//   TAG COMMAND A: increment the bit position pointer and compare
//   the bit pointed to by the bit position pointer to a "zero".
//   Respond if all bits up to and including the current bit match.
//   If they do not match, keep track of the last bit position that matched.
//   Note that only the most recent bit needs to be compared,
//   the results of earlier bit comparisons are stored by the tag
{
    position++;
    if ((position < length)
                && (lastMatch == position-1)
                && (serial[position] == '0'))
    {
        lastMatch++;
        return true;
    }
    return false;
}
bool
Tag::CompareToOne( )
// --these instructions simulate each tag's execution of command B
//                      command B asks the tags to replace the last bit of the
//                              code with a "one", and to respond if the code now
matches
//                              the serial number up to that point
//
//      TAG COMMAND B: compare the bit pointed to by the bit pointer
//      to a "one". Respond if all bits up to and including the
//      current bit match. If they do not match, keep track of
//      the last bit position that matched.
//
{
    if ((position < length)
                && (lastMatch == position-1)
                && (serial[position] == '1'))
    {
        lastMatch++;
        return true;
    }
    return false;
}
void
```

-continued

APPENDIX A

```
Tag::Decrement( )
// --these instructions simulate each tag's execution of command C
//        command C decreases the tag's bit pointer by 1,
//        it is used as the reader algorithm moves back up the tree
//
//    TAG COMMAND C: decrement the bit position pointer.
//    If the bit position pointer is less than the number
//    of the last bit position that matched, decrease the
//    variable noting the last bit position that matched accordingly.
//
{
    position--;
    if (lastMatch == position) {
        lastMatch--;
    }
}
bool
Tag::IsMatch( )
//    --these instructions simulate each tag's execution of command D
//
//
//    TAG COMMAND D: Respond if all bits up to and including
//    the current bit match, and the tag's serial number has no more bits in it.
//
{
    return ((lastMatch == position) && (position == length-1));
}
//////////////////////////////////////////////////////////////
//
//                      The code above this point is mostly the simulation code for
//                      the tag hardware and firmware on many tags, and the simulation
//                      of the communication channel
//
//////////////////////////////////////////////////////////////
//////////////////////////////////////////////////////////////
// class Node --
//                      Defines a node of the binary tree that will hold the tag data
//                      Nodes which represent a unique tag will have tag_found TRUE
//
//                      The following is a C++ implementation of a reader's
//            scanning algorithm, the binary tree algorithm disclosed in the text.
//
//            The main reader's recursive scanning algorithm is a method of this class.
//            When Node is called with a binary string, it scans for all tags which
//            start with that string, by checking the current string, and then calling
//            itself with a '0' appended to the string, and then calling itself again
//            with a '1' appended to the string.
//
//                      In a implementation with real tags, the procedures SendCommandA, etc.
//            would be implemented by actually sending the commands over the media
//            and listening for responses from any tags within range. If one or more
//                      responded, SendCommandA etc. would return TRUE. If no tags responded,
//            SendCommandA etc. would return FALSE.
//
//
//////////////////////////////////////////////////////////////
class Node {
public:
    Node(const char* str);
    void Display(int indent = 0);
    void listtags( );
private:
    Node* upper;
    Node* lower;
    char* partial_serial_number;
    int numbits;
    bool tag_found;
};
Node::Node(const char* str)              // called with a string like '10110'
    : upper(0),                          // pointers to child nodes of the B-tree
      lower(0),
```

APPENDIX A

```
            partial_serial_number(strdup(str)),          // partial_serial_number is stored as
                                                         // an ascii string for convenience
                                                // in this code
            numbits(strlen(str)),
            tag_found(Tag::SendCommandD( ))
                                        // command D would ordinarily be sent
                                    // on specified boundaries only, for efficiency
                                    // in this simulation tags with serial numbers
                                            // of any length are allowed for ease of hand
                                            // testing
{
        printf("node %s\n", partial_serial_number);
        if (strlen(str) < MAXBITS) {
                if (Tag::SendCommandA( )) {              // if true, create a new node (lower)
                                                         // because at least one tag responded
                        char *buf = new char[numbits + 2];
                        strcpy(buf, str);
                        buf[numbits] = '0';              // '0' appended
buf[numbits+1] = '\0';                                   // null for end of string
lower = new Node(buf);                                   // new node created (recursive call)
}
if (Tag::SendCommandB( )) {                              // if true, create a new node (upper)
                                                         // because at least 1 tag responded
char *buf = new char[numbits + 2];
strcpy(buf, str);
buf[numbits] = '1';                                      // '1' appended
buf[numbits+1] = '\0';                                   // null for end of string
upper = new Node(buf);                                   // new node created (recursive call)
}
Tag::SendCommandC( );                                    // done with this node, send command C
                                                         // to tags to move them back up the
                                                         // tree with us
        }
}
void Node::Display(int indent)
// this is a example of a procedure which extracts the tag information from the
// binary tree. This procedure prints out information about each node of the tree
// with an arrow pointing to nodes which represent tags
{
        if (numbits > 0) {
                printf("%s %s\n",
                                partial_serial_number,
                                tag_found ? "<-------" : " ");
        }
        if (lower) {
                printf("%*s", indent, "1:");
                lower->Display(indent+1);
        }
        if (upper) {
                printf("%*s", indent, "u:");
                upper->Display(indent+1);
        }
}
void Node::listtags( )
// This procedure prints out each tag from the tree by walking the tree
{
        if (numbits > 0) {
                if (tag_found) { printf("%s\n", partial_serial_number);}
        }
        if (lower) {
                lower->listtags( );
        }
        if (upper) {
                upper->listtags( );
        }
}
//////////////////////////////////////////////////////////////
// main --
//                      Reads a test file containing tag id's represented as a string
//                      of '1' and '0' characters, separated by newline characters.
```

-continued

APPENDIX A

```
//                    Executes the search algorithm (in Node), which builds binary tree,
//              then displays the result.
//
////////////////////////////////////////////////////////////////////
int
main(int argc, char* argv[ ])
{
    if (argc != 2) {
        fprintf(stderr, "Usage: %s testfile\n", argv[0]);
        exit(1);
    }
    // Read the test file contents. There should be one entry per line.
    char buf [MAXBITS+1];
    FILE* fp = fopen(argv[1], "r");
    while (fgets(buf, MAXBITS+1, fp)) {
        // Read the next line from the file and make sure it only
        // consists of '0' and '1' characters.
        size_t length = strlen(buf);
        while (length > 0 && buf[length-1] == '\n')
            length--;
        buf[length] = 0;
        size_t i;
        for (i=0; i < length; i++) {
            if (buf[i] != '0' && buf[i] != '1')
                break;
        }
        if (i != length)
            continue;
        // Add the entry to the list of tags.
        Tag::AddTag(buf);
    }
    // Build the tree and then display it.
    Node* tree = new Node("");           // Node does the whole search algorithm
    printf("\n\nprintout of all nodes of the binary tree, arrows point at tags\n");
    tree->Display( );
    printf("\n\nlist of all tags found\n");
    tree->listtags( );
    return 0;
}
```

What is claimed is:

1. A reader, comprising:
a transmitter to transmit, in one command, a portion of an identification code, the portion comprising a plurality of bits but not the entire identification code; and
a receiver to receive a response from a tag, which has a match to said portion, wherein the response indicates at least one next bit in said tag's identification code.

2. The reader of claim 1, wherein the command further comprises information indicating a position of said portion in an identification code; and said information comprises one of:
a mask; and
a bit position pointer.

3. A tag, comprising:
a receiver to receive, in one command from a reader, a portion of an identification code, the portion comprising a plurality of bits but not the entire identification code; and
a transmitter to transmit a response from the tag, which has a match to said portion, wherein the response indicates at least one next bit in said tag's identification code.

4. The tag of claim 3, wherein the command further comprises a bit position pointer to indicate a position of said portion in an identification code.

5. The tag of claim 3, further comprising:
non-volatile memory coupled to at least one of the receiver or the transmitter.

6. The tag of claim 3, wherein the tag is disposed on a product in a store.

7. The tag of claim 3, wherein the tag is associated with a household appliance.

8. A reader, comprising:
means for transmitting, in one command, a portion of an identification code, the portion comprising a plurality of bits but not the entire identification code; and
means for receiving a response from a tag, which has a match to said portion, wherein the response indicates at least one next bit in said tag's identification code.

9. A tag, comprising:
means for receiving, in one command from a reader, a portion of an identification code, the portion comprising a plurality of bits but not the entire identification code; and
means for transmitting a response from the tag, which has a match to said portion, wherein the response indicates at least one next bit in said tag's identification code.

10. A reader, comprising:
a microcontroller to execute a program;
a transmitter coupled to the microcontroller to transmit, in one command, a portion of an identification code, the portion comprising a plurality of bits but not the entire identification code; and
a receiver coupled to the microcontroller to receive a response from a tag, which has a match to said portion, wherein the response indicates at least one next bit in said tag's identification code.

11. The reader of claim 10, wherein the command further comprises information indicating a position of said portion in an identification code; and the information comprises a bit position pointer.

12. The reader of claim 10, further comprising:
a network interface coupled to the microcontroller.

13. The reader of claim 12, further comprising:
a memory coupled to the microcontroller and the network interface, the network interface to receive data from at least one of the microcontroller or the memory.

14. The reader of claim 13, wherein the data is a list of tags identified in an interrogation.

15. A tag, comprising:
a receiver to receive, in one command from a reader, a portion of an identification code, the portion comprising a plurality of bits but not the entire identification code; and
a transmitter to transmit a response from the tag, which has a match to said portion, wherein the response indicates at least one next bit in said tag's identification code;
wherein the tag has only one integrated circuit.

16. The tag of claim 15, wherein the command further comprises information indicating a position of said portion in an identification code; and the information comprises a bit position pointer.

17. The tag of claim 15, wherein the integrated circuit is fabricated from a wafer comprising a plurality of integrated circuits.

18. The tag of claim 15, wherein the tag is fabricated through a fluidic self-assembly process.

19. The tag of claim 15, further comprising:
non-volatile memory coupled to at least one of the receiver or the transmitter.

20. The tag of claim 15, wherein the tag is disposed on a product in a store.

21. The tag of claim 15, wherein the tag is associated with a household appliance.

22. A reader, comprising:
a microcontroller to execute a program;
means for transmitting, in one command and under the control of the microcontroller, a portion of an identification code, the portion comprising a plurality of bits but not the entire identification code; and
means for receiving a response from a tag, which has a match to said portion, wherein the response indicates at least one next bit in said tag's identification code.

23. A tag, comprising:
means for receiving, in one command from a reader, a portion of an identification code, the portion comprising a plurality of bits but not the entire identification code; and
means for transmitting a response from the tag, which has a match to said portion, wherein the response indicates at least one next bit in said tag's identification code;
wherein the tag has only one integrated circuit.

24. A tag, comprising:
a receiver to receive, in one command from a reader, a portion of an identification code, the portion comprising a plurality of bits but not the entire identification code; and
a transmitter to transmit a response from the tag, which has a match to said portion, wherein the response indicates at least one next bit in said tag's identification code;
wherein the tag includes an integrated circuit which is received by a substrate and which is connected with an antenna on the substrate.

25. A method performed by a reader, said method comprising:
transmitting, in one command, a portion of an identification code, the portion comprising a plurality of bits but not the entire identification code;
receiving a response from a tag, which has a match to said portion, wherein the response indicates at least one next bit in said tag's identification code; and
communicating said tag's identification code to a processing system over a network.

26. The method of claim 25 wherein the reader comprises an Ethernet interface for the communicating.

27. The method of claim 25 wherein the reader comprises a first antenna and a second antenna.

* * * * *